US012562543B2

(12) United States Patent
Ohmori et al.

(10) Patent No.: US 12,562,543 B2
(45) Date of Patent: Feb. 24, 2026

(54) LASER IRRADIATION APPARATUS, LASER IRRADIATION METHOD, AND RECORDING MEDIUM RECORDING PROGRAM TO BE READABLE

(71) Applicant: JSW Aktina System Co., Ltd., Yokohama (JP)

(72) Inventors: Kenichi Ohmori, Yokohama (JP); Yuzaburo Ohta, Yokohama (JP); Rei Matsushita, Yokohama (JP); Nobuo Oku, Yokohama (JP)

(73) Assignee: JSW Aktina System Co., Ltd., Yokohama (JP)

( * ) Notice: Subject to any disclaimer, the term of this patent is extended or adjusted under 35 U.S.C. 154(b) by 953 days.

(21) Appl. No.: 17/747,204

(22) Filed: May 18, 2022

(65) Prior Publication Data

US 2023/0006408 A1       Jan. 5, 2023

(30) Foreign Application Priority Data

Jun. 30, 2021    (JP) ................................. 2021-109201

(51) Int. Cl.
| | |
|---|---|
| *H01S 3/00* | (2006.01) |
| *G02F 1/01* | (2006.01) |
| *H01S 3/225* | (2006.01) |

(52) U.S. Cl.
CPC .......... *H01S 3/0085* (2013.01); *G02F 1/0121* (2013.01); *G02F 1/0136* (2013.01); *G02F 2203/48* (2013.01); *H01S 3/225* (2013.01)

(58) Field of Classification Search
CPC .... H01S 3/0085; H01S 3/225; H01S 3/10061; H01S 3/10015; H01S 3/2308; H01S 3/2366; G02F 1/0121; G02F 1/0136; G02F 2203/48; H01L 21/02422; H01L 21/02532; H01L 21/02686; H01L 21/67115

See application file for complete search history.

(56) References Cited

U.S. PATENT DOCUMENTS

| | | |
|---|---|---|
| 2007/0020785 A1 | 1/2007 | Bruland et al. |
| 2019/0271871 A1 | 9/2019 | Chung et al. |
| 2020/0333718 A1 | 10/2020 | Takiguchi et al. |

(Continued)

FOREIGN PATENT DOCUMENTS

| | | |
|---|---|---|
| JP | 2008-288363 A1 | 11/2008 |
| JP | 2012-15545 A | 1/2012 |

(Continued)

OTHER PUBLICATIONS

Notice of Reasons for Refusal for Japanese Application No. 2021-109201 mailed Dec. 3, 2024, with its machine translation, 5 pages.

(Continued)

*Primary Examiner* — Robert G Bachner
(74) *Attorney, Agent, or Firm* — Christian S. Hans; Bret E. Field; Bozicevic, Field & Francis LLP

(57) ABSTRACT

A laser irradiation apparatus is a laser irradiation apparatus including a plurality of laser light sources, the laser irradiation apparatus including a control unit configured to perform control with regard to laser emitted from the plurality of laser light sources, in which the control unit acquires characteristic information of each of the plurality of laser light sources, and performs a predetermined process according to each piece of acquired characteristic information.

12 Claims, 18 Drawing Sheets

(56)     References Cited

U.S. PATENT DOCUMENTS

2021/0402516 A1     12/2021   Sakamoto et al.
2022/0331910 A1     10/2022   Ohmori et al.

FOREIGN PATENT DOCUMENTS

| JP | 2014-75562 | A1 | 4/2014 |
| JP | 2018-18866 | A1 | 2/2018 |
| JP | 2021-44412 | A1 | 3/2021 |
| TW | 202023723 | A | 7/2020 |
| TW | 202040644 | A | 11/2020 |
| WO | WO2014054687 | A1 | 4/2014 |

OTHER PUBLICATIONS

Office Action for Taiwan Application No. 111120618 mailed Aug. 19, 2025, with its English translation, 12 pages.

F I G . 1
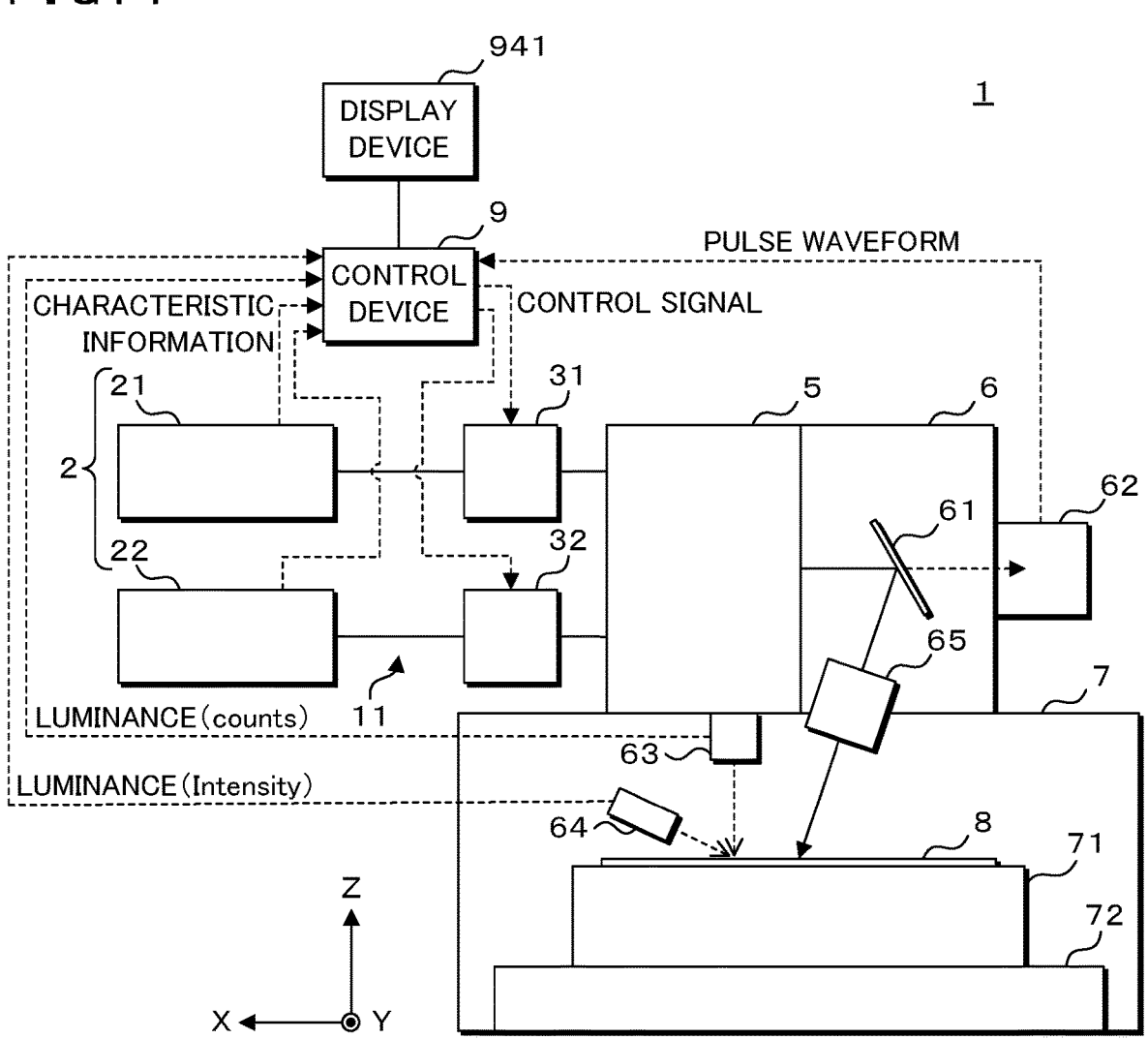

F I G . 2
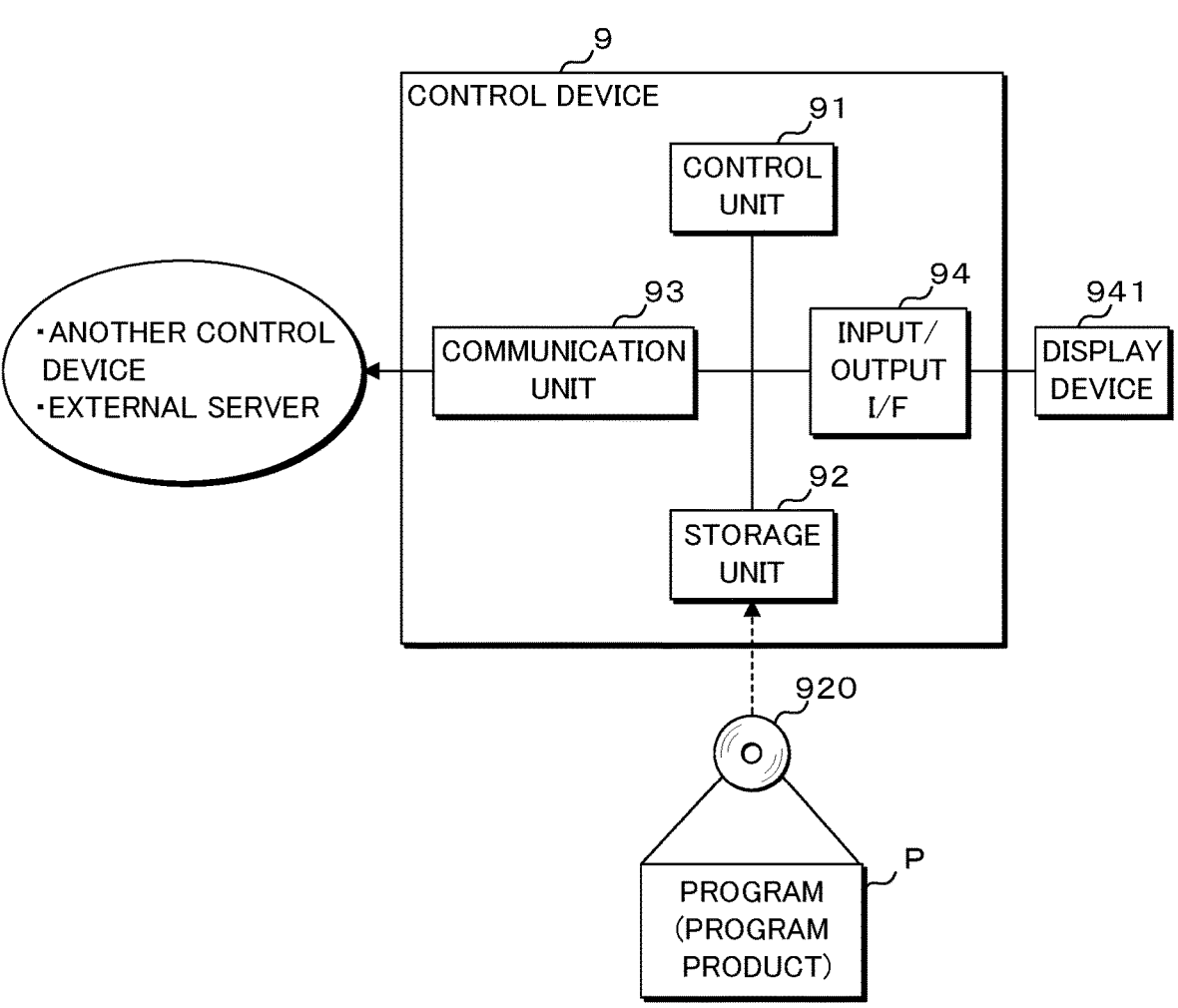

F I G . 4
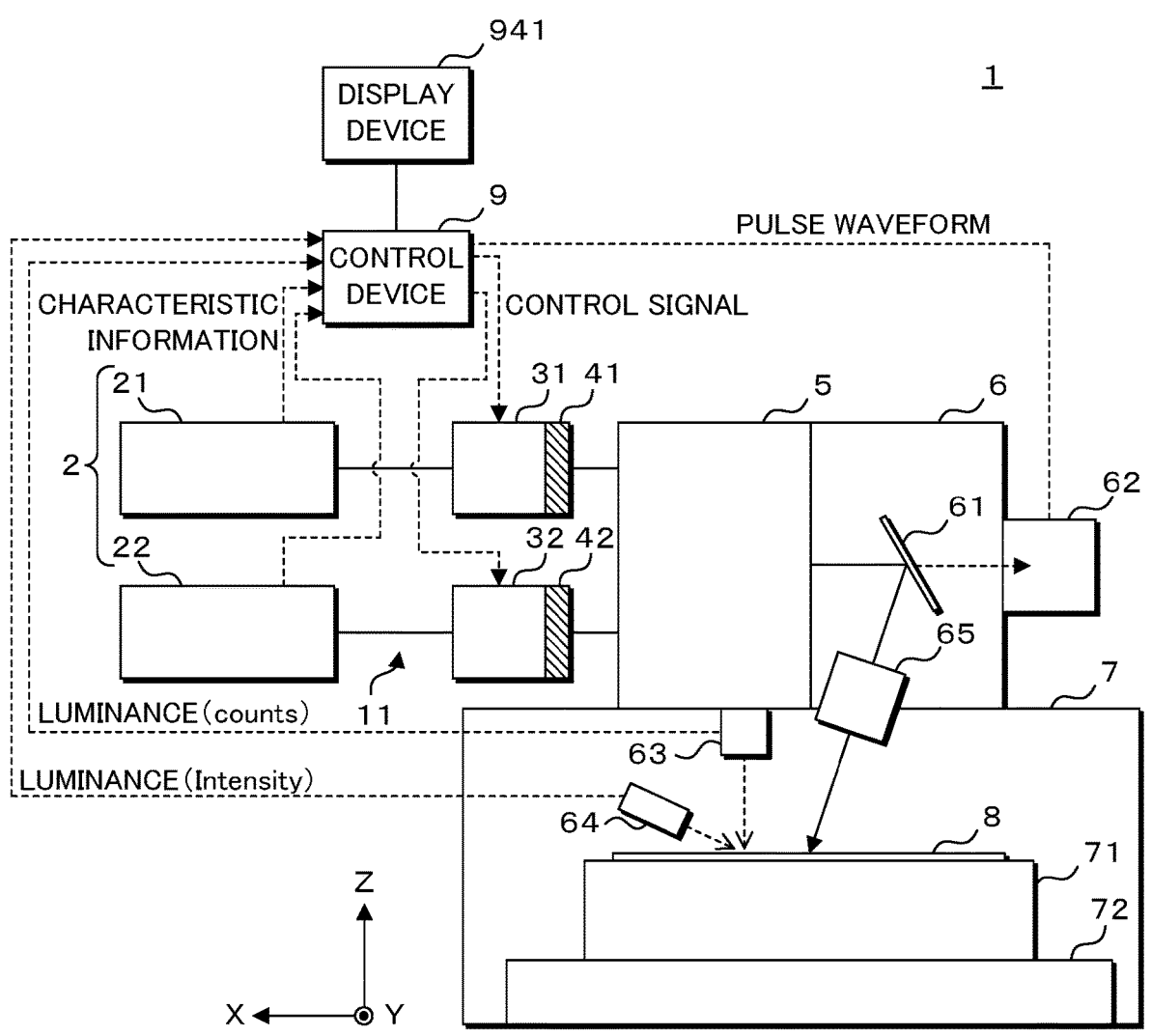

F I G . 5

| | TRANSMITTANCE | | | | | |
|---|---|---|---|---|---|---|
| | Tx1 | Tx2 | Tx3 | Tx4 | Tx5 | ・・・ |
| POLARIZATION | r1 | r2 | r3 | r4 | r5 | ・・・ |

F I G . 6

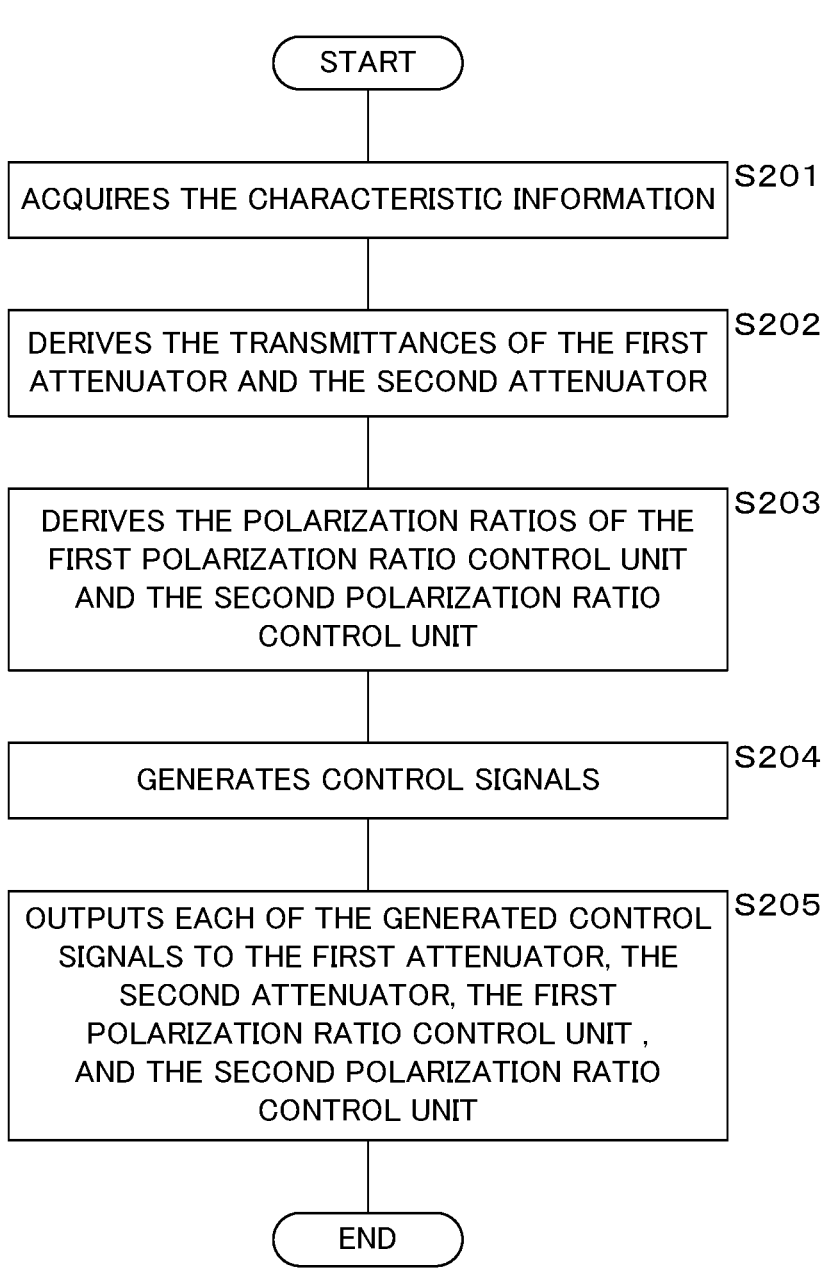

START

ACQUIRES THE CHARACTERISTIC INFORMATION  S201

DERIVES THE TRANSMITTANCES OF THE FIRST ATTENUATOR AND THE SECOND ATTENUATOR  S202

DERIVES THE POLARIZATION RATIOS OF THE FIRST POLARIZATION RATIO CONTROL UNIT AND THE SECOND POLARIZATION RATIO CONTROL UNIT  S203

GENERATES CONTROL SIGNALS  S204

OUTPUTS EACH OF THE GENERATED CONTROL SIGNALS TO THE FIRST ATTENUATOR, THE SECOND ATTENUATOR, THE FIRST POLARIZATION RATIO CONTROL UNIT , AND THE SECOND POLARIZATION RATIO CONTROL UNIT  S205

END

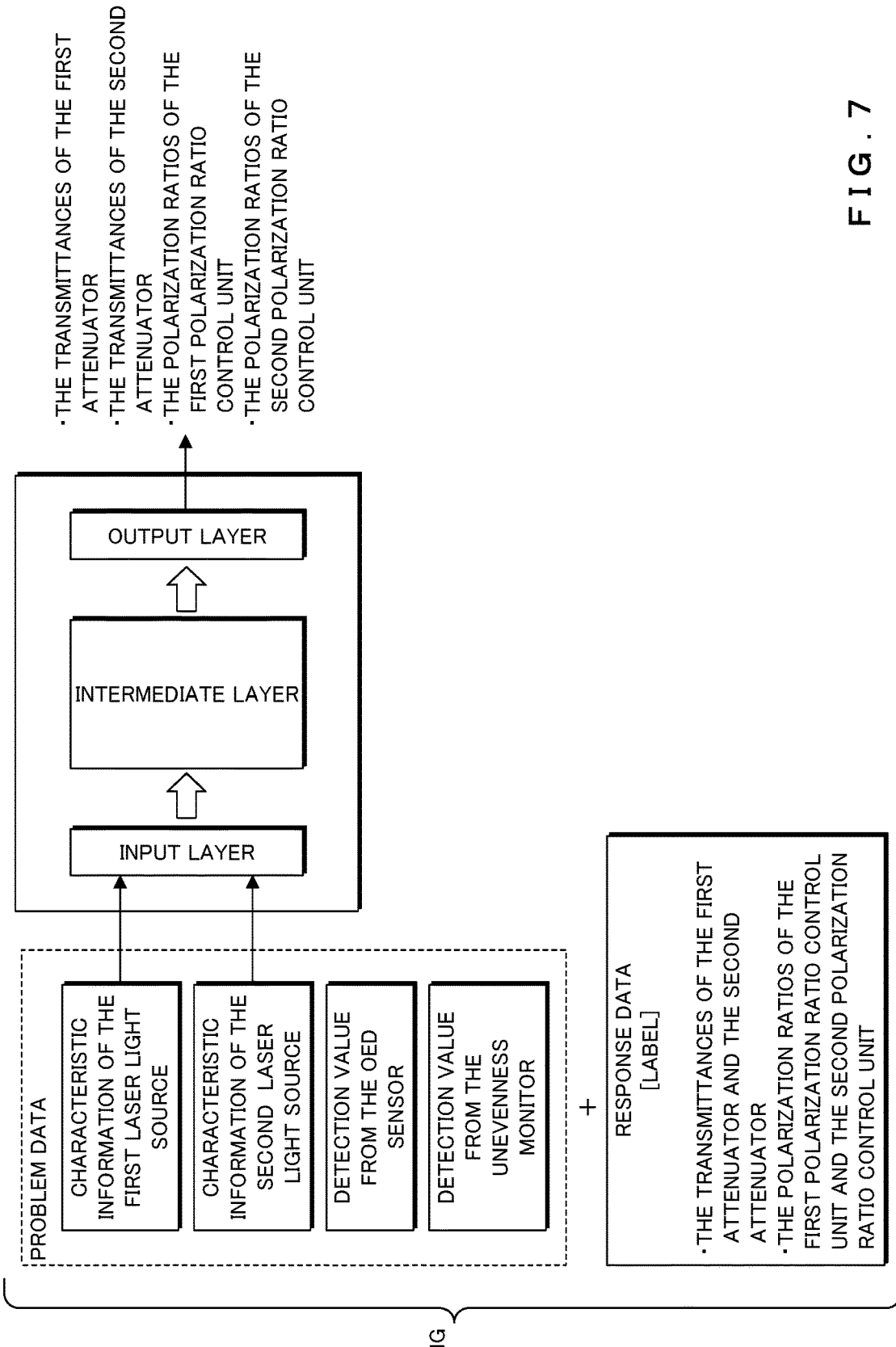

·THE TRANSMITTANCES OF THE FIRST ATTENUATOR
·THE TRANSMITTANCES OF THE SECOND ATTENUATOR
·THE POLARIZATION RATIOS OF THE FIRST POLARIZATION RATIO CONTROL UNIT
·THE POLARIZATION RATIOS OF THE SECOND POLARIZATION RATIO CONTROL UNIT

OUTPUT LAYER

INTERMEDIATE LAYER

INPUT LAYER

PROBLEM DATA

CHARACTERISTIC INFORMATION OF THE FIRST LASER LIGHT SOURCE

CHARACTERISTIC INFORMATION OF THE SECOND LASER LIGHT SOURCE

DETECTION VALUE FROM THE OED SENSOR

DETECTION VALUE FROM THE UNEVENNESS MONITOR

RESPONSE DATA [LABEL]

·THE TRANSMITTANCES OF THE FIRST ATTENUATOR AND THE SECOND ATTENUATOR
·THE POLARIZATION RATIOS OF THE FIRST POLARIZATION RATIO CONTROL UNIT AND THE SECOND POLARIZATION RATIO CONTROL UNIT

TRAINING DATA

F I G . 7

F I G . 8
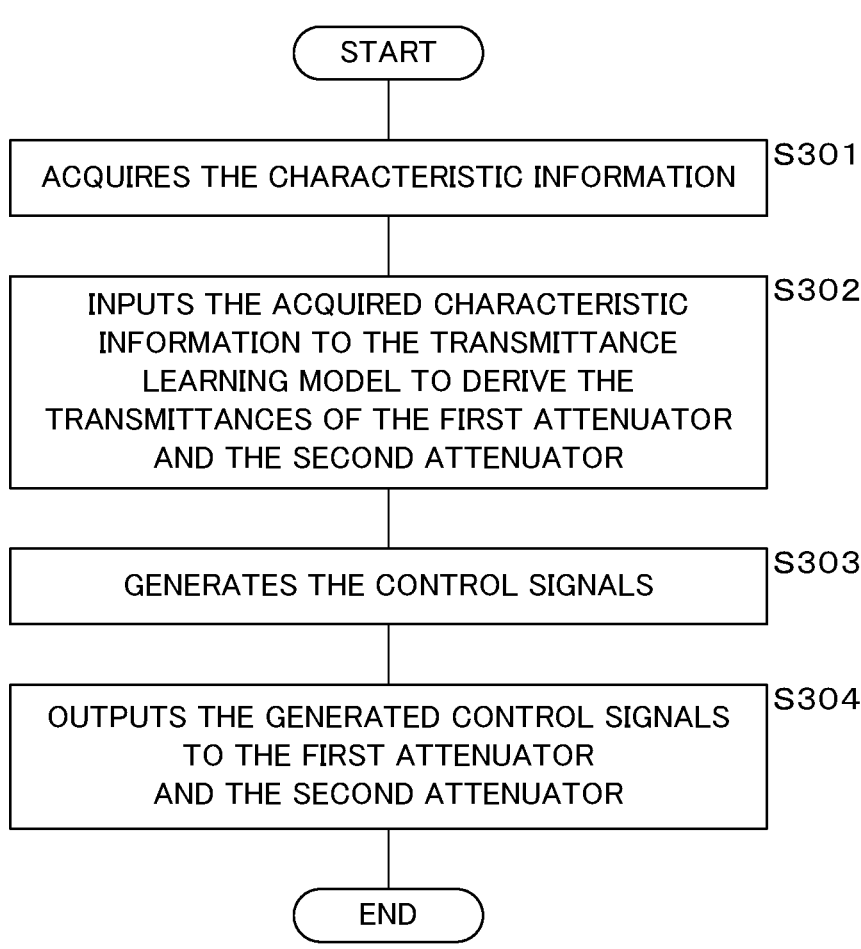

F I G . 9
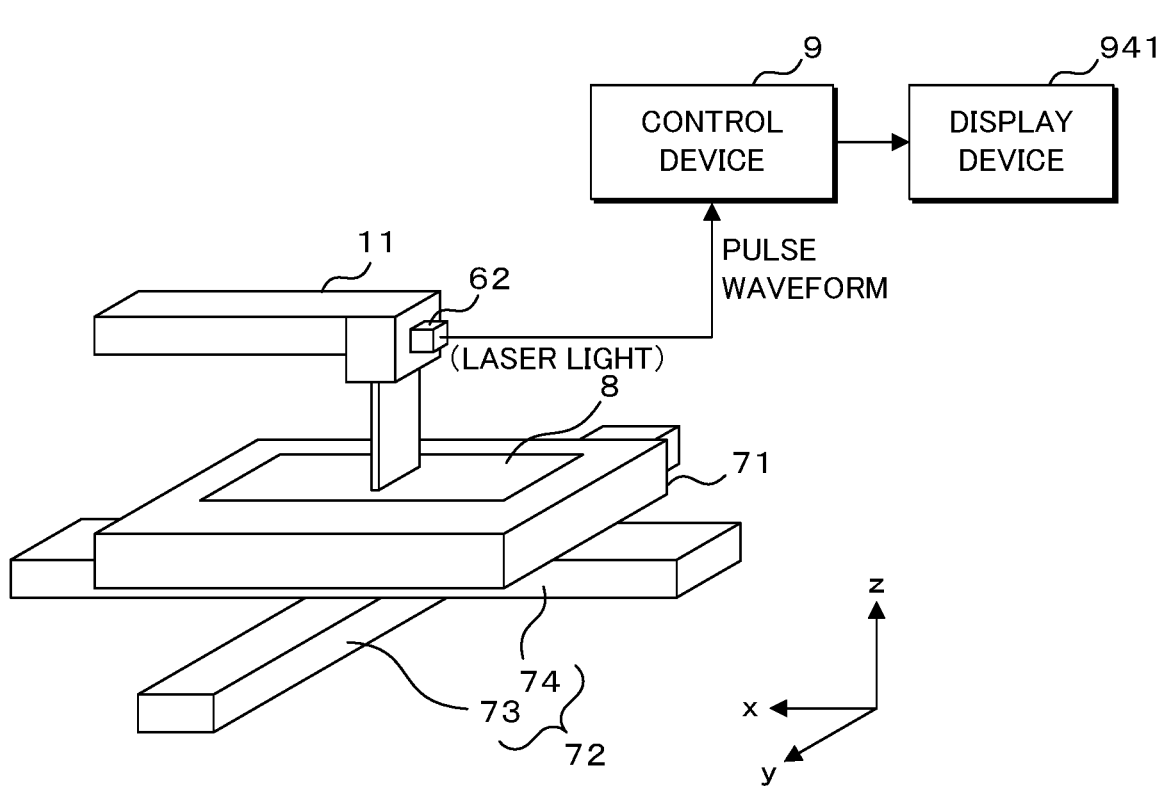

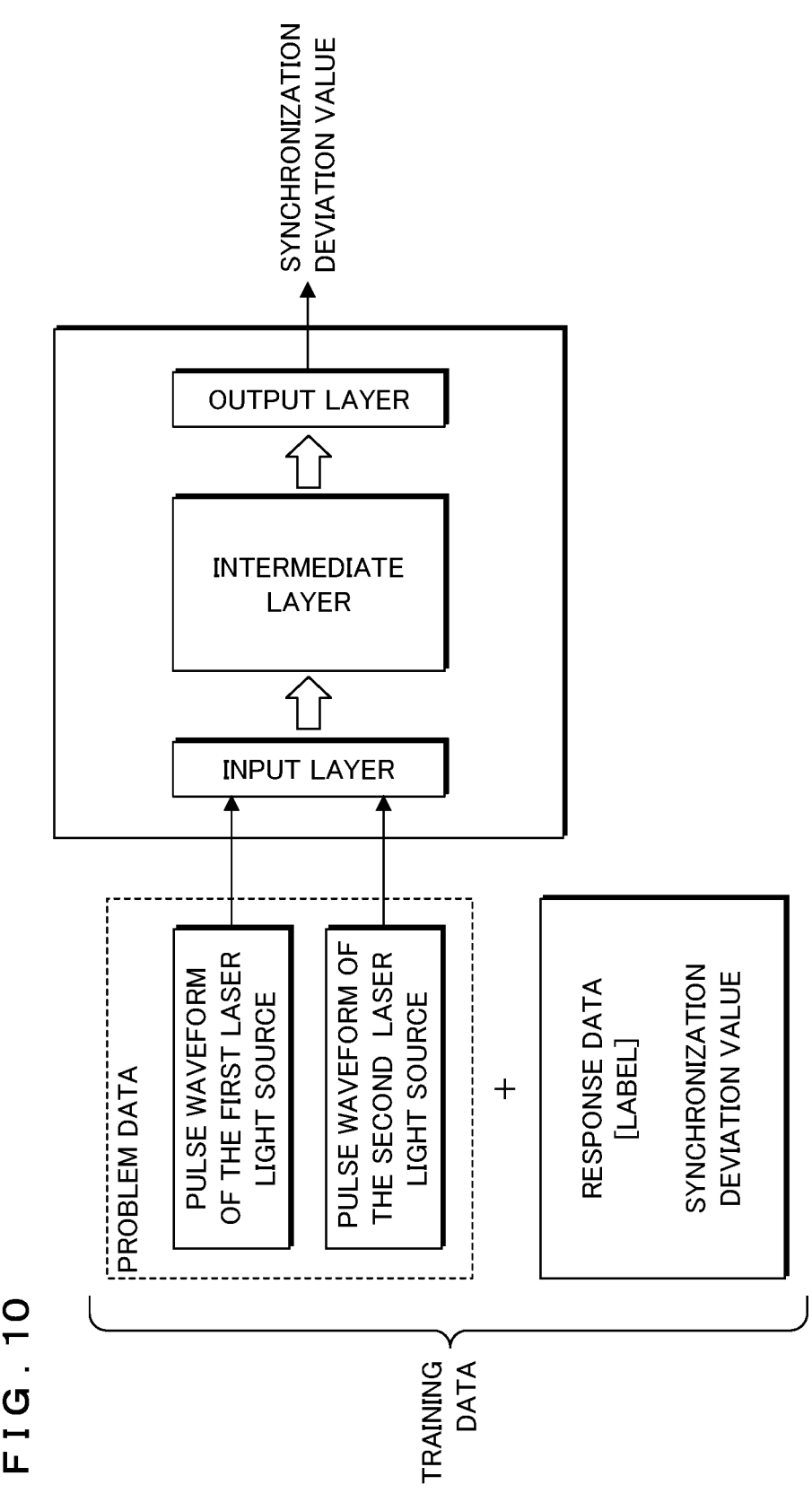
F I G . 1 0

|  | | SYNCHRONIZATION DEVIATION VALUE BY THE SYNCHRONIZATION DEVIATION VALUE LEARNING MODEL | | | | | | | | | | | CORRECT ANSWER RATE |
|---|---|---|---|---|---|---|---|---|---|---|---|---|---|
| | | -5ns | -4ns | -3ns | -2ns | -1ns | 0ns | 1ns | 2ns | 3ns | 4ns | 5ns | |
| ACTUAL SYNCHRONIZATION DEVIATION VALUE | -5ns | 30 | 0 | 0 | 0 | 0 | 0 | 0 | 0 | 0 | 0 | 0 | 100 |
| | -4ns | 1 | 29 | 0 | 0 | 0 | 0 | 0 | 0 | 0 | 0 | 0 | 96.6 |
| | -3ns | 0 | 1 | 29 | 0 | 0 | 0 | 0 | 0 | 0 | 0 | 0 | 96.6 |
| | -2ns | 0 | 0 | 0 | 28 | 2 | 0 | 0 | 0 | 0 | 0 | 0 | 93.3 |
| | -1ns | 0 | 0 | 0 | 0 | 30 | 0 | 0 | 0 | 0 | 0 | 0 | 100 |
| | 0ns | 0 | 0 | 0 | 0 | 1 | 29 | 0 | 0 | 0 | 0 | 0 | 96.6 |
| | 1ns | 0 | 0 | 0 | 0 | 0 | 2 | 27 | 1 | 0 | 0 | 0 | 90.0 |
| | 2ns | 0 | 0 | 0 | 0 | 0 | 0 | 0 | 29 | 1 | 0 | 0 | 96.6 |
| | 3ns | 0 | 0 | 0 | 0 | 0 | 0 | 0 | 0 | 28 | 2 | 0 | 93.3 |
| | 4ns | 0 | 0 | 0 | 0 | 0 | 0 | 0 | 0 | 0 | 30 | 0 | 100 |
| | 5ns | 0 | 0 | 0 | 0 | 0 | 0 | 0 | 0 | 0 | 0 | 30 | 100 |

F I G . 14
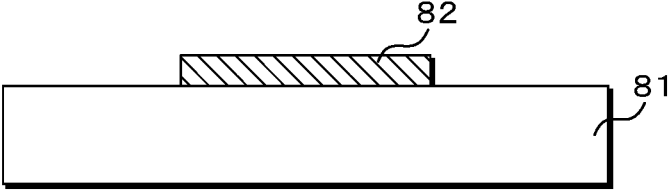

F I G . 15
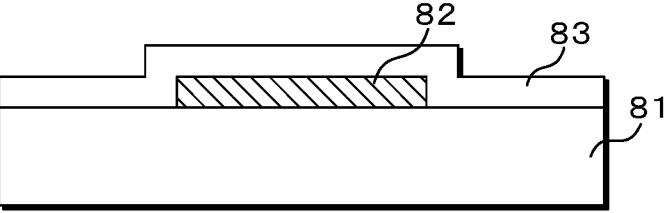

F I G . 16
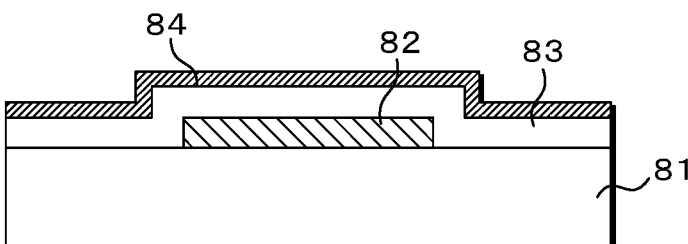

F I G . 17
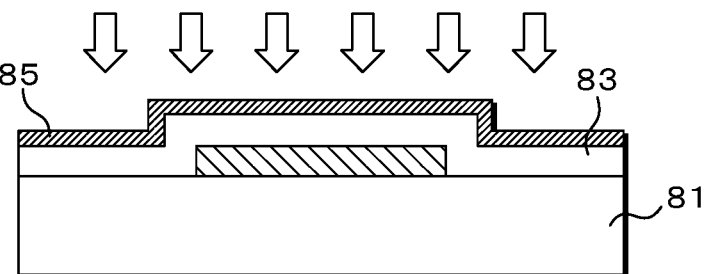

F I G . 18
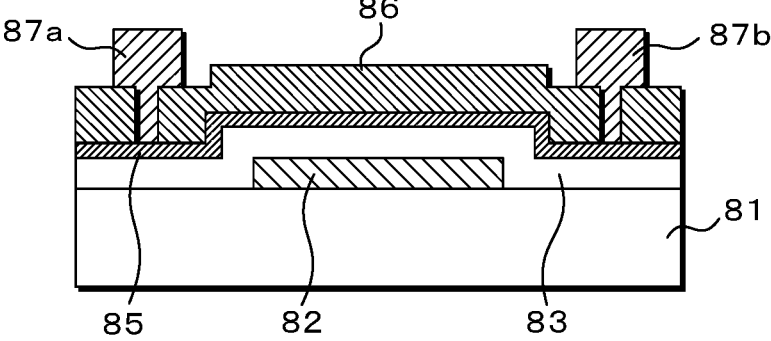

1

LASER IRRADIATION APPARATUS, LASER IRRADIATION METHOD, AND RECORDING MEDIUM RECORDING PROGRAM TO BE READABLE

CROSS-REFERENCE TO RELATED APPLICATION

This Non-provisional application claims priority under 35 U.S.C § 119(a) on Patent Application No. 2021-109201 filed in Japan on Jun. 30, 2021, the entire contents of which are hereby incorporated by reference.

FIELD

The present disclosure relates to a laser irradiation apparatus, a laser irradiation method, and a recording medium recording a program to be readable.

BACKGROUND

A laser annealing apparatus for forming a polycrystalline silicon thin film has been known (for example, Japanese Patent Application Laid-Open No. 2012-15545).

The laser annealing apparatus described in Japanese Patent Application Laid-Open No. 2012-15545 includes a waveform shaping device that shapes a waveform of a laser light pulse, and a polycrystalline silicon thin film is formed by irradiating an amorphous silicon film with laser light formed in a line shape by the waveform shaping device.

However, in the laser annealing apparatus of Japanese Patent Application Laid-Open No. 2012-15545, a point of performing control with regard to laser light emitted from a plurality of laser light sources is not taken into consideration.

SUMMARY

The disclosure has been made in view of such circumstances, and an object of the disclosure is to provide a laser irradiation apparatus, etc. capable of efficiently controlling control with regard to laser light emitted from a plurality of laser light sources.

A laser irradiation apparatus according to this aspect is a laser irradiation apparatus including a plurality of laser light sources, the laser irradiation apparatus including a control unit configured to perform control with regard to laser emitted from the plurality of laser light sources, in which the control unit acquires characteristic information of each of the plurality of laser light sources, and performs a predetermined process according to each piece of acquired characteristic information.

A laser irradiation method according to this aspect causes a computer configured to perform control with regard to laser emitted from a plurality of laser light sources to execute processes of (A) acquiring characteristic information of each of the plurality of laser light sources, and (B) performing a predetermined process according to each piece of acquired characteristic information.

A program according to this aspect causes a computer configured to perform control with regard to laser emitted from a plurality of laser light sources to execute processes of (A) acquiring characteristic information of each of the plurality of laser light sources, and (B) performing a predetermined process according to each piece of acquired characteristic information.

2

According to the disclosure, it is possible to provide a laser irradiation apparatus, etc. that efficiently performs control with regard to laser emitted from a plurality of laser light sources.

BRIEF DESCRIPTION OF SEVERAL VIEWS OF DRAWINGS

FIG. 1 is a diagram illustrating a configuration example of a laser annealing apparatus according to a first embodiment;

FIG. 2 is a diagram illustrating a configuration example of a control device included in the laser annealing apparatus;

FIG. 4 is a diagram illustrating a configuration example of a laser annealing apparatus according to a second embodiment (polarization ratio);

FIG. 5 is an explanatory diagram illustrating an example of a polarization ratio table;

FIG. 6 is a flowchart illustrating an example of a processing procedure by a control unit;

FIG. 7 is an explanatory diagram illustrating an example of a transmittance learning model according to a third embodiment (transmittance learning model);

FIG. 8 is a flowchart illustrating an example of a processing procedure by a control unit;

FIG. 9 is a diagram illustrating a configuration example of a laser annealing apparatus according to a fourth embodiment (synchronization deviation);

FIG. 10 is an explanatory diagram illustrating an example of a synchronization deviation value learning model;

FIG. 11 is an explanatory diagram illustrating synchronization deviation in a pulse signal;

FIG. 12 is an explanatory diagram illustrating an actual synchronization deviation value and a synchronization deviation value by a synchronization deviation value learning model in a confusion matrix;

FIG. 14 is a process sectional view illustrating a method of manufacturing a semiconductor device according to another embodiment (method of manufacturing a semiconductor device);

FIG. 15 is a process sectional view illustrating the method of manufacturing the semiconductor device according to another embodiment (method of manufacturing the semiconductor device);

FIG. 16 is a process sectional view illustrating the method of manufacturing the semiconductor device according to another embodiment (method of manufacturing the semiconductor device);

FIG. 17 is a process sectional view illustrating the method of manufacturing the semiconductor device according to another embodiment (method of manufacturing the semiconductor device); and FIG. 18 is a process sectional view illustrating the method of manufacturing the semiconductor device according to another embodiment (method of manufacturing the semiconductor device).

DETAILED DESCRIPTION

First Embodiment

Figure 3:
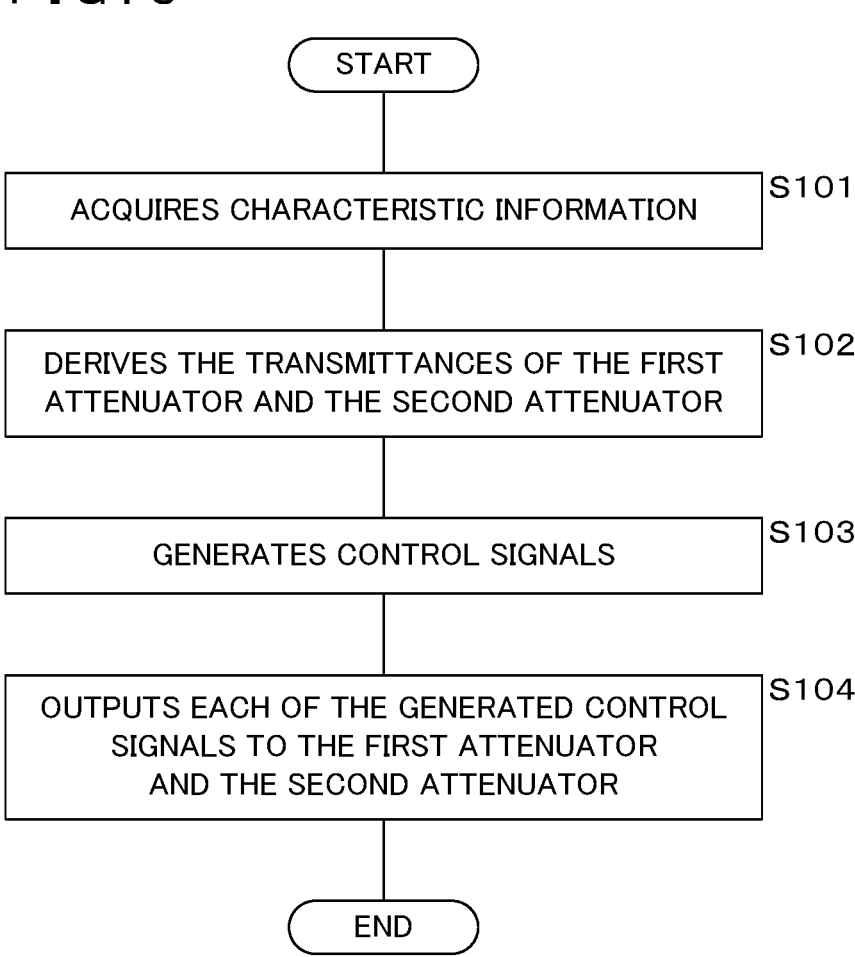
FIG. 3 is a flowchart illustrating an example of a processing procedure by a control unit.

Hereinafter, embodiments of the disclosure will be described. FIG. 1 is a diagram illustrating a configuration example of a laser annealing apparatus 1 according to a first embodiment. FIG. 2 is a diagram illustrating a configuration example of a control device 9 included in the laser annealing apparatus 1. The laser annealing apparatus 1 (laser irradiation apparatus) is, for example, an excimer laser annealing (ELA) apparatus for forming a low temperature poly-silicon (LTPS) film.

The laser annealing apparatus 1 irradiates a silicon film formed on a substrate 8 with laser light. In this way, it is possible to convert an amorphous silicon film (a-Si film) into a polycrystalline silicon film (polysilicon film: p-Si film). For example, the substrate 8 is a transparent substrate such as a glass substrate.

As illustrated in the figure of the present embodiment, in a XYZ three-dimensional Cartesian coordinate system, a Z-direction is a vertical direction and is a direction perpendicular to the substrate 8. An XY-plane is a plane parallel to a plane on which the silicon film of the substrate 8 is formed. For example, an X-direction is a longitudinal direction of the rectangular substrate 8, and a Y-direction is a lateral direction of the substrate 8. When using a $\Theta$-axis stage 71 that can rotate from $0°$ to $90°$ about a Z-axis, the X-direction can be the lateral direction of the substrate 8 and the Y direction can be the longitudinal direction of the substrate 8.

The laser annealing apparatus 1 includes an annealing optical system 11, a laser irradiation chamber 7, and a control device 9. The laser irradiation chamber 7 accommodates a base 72 and a stage 71 disposed on the base 72. In the laser annealing apparatus 1, a silicon film 201 is irradiated with laser light while the substrate 8 is conveyed in a +X-direction by the stage 71. The laser annealing apparatus 1 further includes a biplanar phototube 62, an OED sensor 63, and an unevenness monitor 64 as a detection unit that detects information with regard to emitted laser light.

The annealing optical system 11 is an optical system for generating laser light for crystallizing an amorphous silicon film formed on the substrate 8 and converting the amorphous silicon film into a polysilicon film, and irradiating the amorphous silicon film with the laser light. The annealing optical system 11 is an optical system including a laser light source 2 including a first laser light source 21 and a second laser light source 22, a first attenuator 31, a second attenuator 32, a synthetic optical system 5, a beam shaping optical system 6, an epi-illumination mirror 61, and a projection lens 65 and emitting laser light obtained by synthesizing a plurality of laser light rays.

The laser light source 2 includes the first laser light source 21 and the second laser light source 22, and includes a plurality of laser light sources 2. In the present embodiment, a two-laser light source configuration of the first laser light source 21 and the second laser light source 22 is adopted. However, the disclosure is not limited thereto, and the laser light source 2 may include three or more laser light sources 2.

The first laser light source 21 and the second laser light source 22 are laser generators that generate pulsed laser light as laser light for irradiating the amorphous silicon film (processed object). The generated laser light is laser light for crystallizing a non-crystalline film on the substrate 8 to form a crystallized film, and is, for example, gas laser light such as excimer laser light having a center wavelength of 308 nm. Alternatively, gas laser light is not limited to excimer laser light, and may be another gas laser such as a $CO_2$ laser.

In the first laser light source 21 and the second laser light source 22, a gas such as xenon is enclosed in a chamber, and two resonator mirrors are disposed to face each other with the gas interposed therebetween. A resonator mirror is a total reflection mirror that reflects all light, and a resonator mirror is a partial reflection mirror that transmits a part of light. Gas light excited by the gas is repeatedly reflected between the resonator mirrors, and amplified light is emitted from the resonator mirror as laser light. For example, the first laser light source 21 and the second laser light source 22 repeatedly emit pulsed laser light in a cycle of 500 Hz to 600 Hz. The first laser light source 21 emits the laser light toward the first attenuator 31. The second laser light source 22 emits the laser light toward the second attenuator 32.

The first attenuator 31 and the second attenuator 32 attenuate incident laser light to adjust an energy density to a predetermined energy density. As a characteristic, these attenuators have a transmittance indicating a ratio of the emitted laser light to the incident laser light, and the transmittance is configured to be variable based on a signal from the control device 9.

The first attenuator 31 is provided in the middle of an optical path from the first laser light source 21 to the synthetic optical system 5. The second attenuator 32 is provided in the middle of an optical path from the second laser light source 22 to the synthetic optical system 5. The first attenuator 31 attenuates laser light emitted by the first laser light source 21 according to the transmittance. The second attenuator 32 attenuates laser light emitted by the second laser light source 22 according to the transmittance.

The density E11 of energy emitted from the first attenuator 31 is a value ($E11=E1\times T1$) obtained by multiplying the energy density E1 of laser light emitted from the first laser light source 21 by the transmittance T1 of the first attenuator 31. The density E22 of energy emitted from the second attenuator 32 is a value ($E22=E2\times T2$) obtained by multiplying the energy density E2 of laser light emitted from the second laser light source 22 by the transmittance T2 of the second attenuator 32.

The transmittance T1 of the first attenuator 31 and the transmittance T2 of the second attenuator 32 are set to be changeable (variable) by the control device 9, and the control device 9 changes these transmittances T1 and T2 so that a total value of the density E11 of energy emitted from the first attenuator 31 and the density E22 of energy emitted from the second attenuator 32 is constant ($E1\times T1+E2\times T2=constant$).

The synthetic optical system 5 has, for example, a beam splitter, etc., and synthesizes laser emitted from the first laser light source 21 and laser light emitted from the second laser light source 22. Since the first attenuator 31 and the second attenuator 32 are disposed in the optical path between the synthetic optical system 5 and the first laser light source 21 and the optical path between the synthetic optical system 5 and the second laser light source 22, laser emitted from the first attenuator 31 and laser light emitted from the second attenuator 32 are incident on the synthetic optical system 5, and the laser is synthesized by the synthetic optical system 5.

In a plan view orthogonal to an optical axis, the laser light from the first laser light source 21 and the laser light from the second laser light source 22 overlap each other. By the synthetic optical system 5, the laser light from the first laser light source 21 and the laser light from the second laser light source 22 are spatially overlapped and coaxial, so that synthesized laser light is obtained. The laser light synthesized by the synthetic optical system 5 is incident on the beam shaping optical system 6.

The laser light synthesized by the synthetic optical system 5 is incident on the beam shaping optical system 6, and the beam shaping optical system 6 shapes the incident laser light (synthesized laser light) to generate beam-shaped laser beam suitable for irradiating the silicon film. The beam shaping optical system 6 generates a line-shaped line beam along the Y-direction.

The beam shaping optical system 6 divides one beam into a plurality of beams (a plurality of line beams arranged in the Z-direction) by, for example, a homogenizer including a lens array. After dividing into the plurality of beams, the beams may be shaped into a line beam shape by being synthesized using a condenser lens. The beam shaping optical system 6 emits the generated (shaped) line-shaped laser light to the epi-illumination mirror 61.

The epi-illumination mirror 61 is a rectangular reflection mirror extending in the-Y direction, and reflects laser light which is a plurality of line beams generated by the beam shaping optical system 6. The epi-illumination mirror 61 is, for example, a dichroic mirror, which is a partial reflection mirror that transmits a part of light. The epi-illumination mirror 61 reflects line-shaped laser light to generate reflected light, and at the same time, transmits a part of the line-shaped laser light to generate transmitted light. The epi-illumination mirror 61 irradiates the silicon film of the substrate 8 with laser light, which is reflected light, and emits laser light, which is transmitted light, to a pulse measuring instrument such as the biplanar phototube 62.

The projection lens 65 is disposed above the substrate. The projection lens 65 has a plurality of lenses for projecting laser light onto the substrate, that is, the silicon film. The projection lens 65 concentrates the laser light on the substrate. On the substrate 8, laser light forms a line-shaped irradiation region along the Y-direction. That is, on the substrate 8, laser light is a line beam whose longitudinal direction is the Y-direction. Further, the silicon film is irradiated with laser light while the substrate 8 is conveyed in the +X-direction. In this way, it is possible to irradiate a band-shaped region having a length of the irradiation region in the Y-direction as a width with laser light.

The line beam-shaped laser light emitted to the epi-illumination mirror 61 has a beam shape in which a short-axis width is widened, that is, after being emitted from the condenser lens, the short-axis width is slightly widened, and the line beam-shaped laser light has a collapsed shape. The laser light reflected by the epi-illumination mirror 61 passes through the projection lens 65 and is shaped into line beam-shaped laser light having a short-axis width of about ⅕.

The biplanar phototube 62 is provided at an end of the annealing optical system 11 adjacent to the beam shaping optical system 6, and detects a pulse waveform of laser light emitted from the laser light source 2 based on transmitted light transmitted through the epi-illumination mirror 61. The biplanar phototube 62 outputs (transmits) a detected pulse waveform to the control device 9.

The OED sensor 63 includes an optical sensor, and detects reflected light (reflected light reflected by the substrate 8) of light emitted from a light source (separate light source) separate from the laser light source 2 to acquire information related to a crystal surface on the substrate 8. The OED sensor 63 outputs (transmits as a signal) the luminance (detection value) of the detected reflected light to the control device 9.

The unevenness monitor 64 includes a line camera and line illumination, photographs a region of interest of the substrate 8 irradiated with laser light using the line camera, and detects the average luminance of the region of interest included in a photographed image to acquire information related to scattered light of a surface shape of the substrate 8. The unevenness monitor 64 outputs (transmits as a signal)

the detected average luminance (detection value) of the substrate 8 (region of interest) to the control device 9.

The first laser light source 21 and the second laser light source 22 (a plurality of laser light sources 2) included in the laser light source 2 all have the same specifications. However, the density of emitted energy has a different value due to an individual product difference (E1≠E2). The first laser light source 21 and the second laser light source 22 have characteristic information such as, for example, inter-pulse energy stability (δ/mean) or pointing stability (P). In the first laser light source 21 and the second laser light source 22, there are individual differences as industrial products in the characteristic such as inter-pulse energy stability (energy stability: δ/mean) or pointing stability (pointing: P).

The inter-pulse energy stability (δ/mean) is defined as a product specification so as to be, for example, within 0.30% (<0.30%). A value (δ) indicating the inter-pulse energy stability corresponds to a value indicating a so-called degree of variation (standard deviation). As the value decreases, the stability increases (variation is small), and the characteristic is more excellent. As the value (δ) increases, the stability decreases (variation is large), and the characteristic is poorer.

The pointing stability (P) is defined as a product specification so as to be, for example, within ±0.15 mrad. A value (P) indicating the pointing stability corresponds to a value indicating a so-called degree of variation. As the value decreases (closer to 0), the stability increases (variation is small), and the characteristic is more excellent. As the value (P) increases, the stability decreases (variation is large), and the characteristic is poorer.

As described above, in the first laser light source 21 and the second laser light source 22 (the plurality of laser light sources 2) having the same specifications, individual differences, that is, variations in characteristics (differences in characteristic information) may occur as industrial products. Although the details will be described later, the control device 9 sets the transmittance of an attenuator connected to a laser light source 2 having an excellent characteristic (less variation) to be larger than the transmittance of an attenuator connected to the other laser light source 2 based on characteristic information of each of the first laser light source 21 and the second laser light source 22. In this way, laser light emitted from the laser light source 2 having the excellent characteristic (less variation) may be preferentially used to irradiate the substrate 8 with laser light obtained by synthesizing laser light from the first laser light source 21 and the second laser light source 22, thereby improving processing quality.

The control device 9 is an information processing device such as a personal computer or a server device that controls or manages the laser annealing apparatus 1 as a whole or in an integrated manner. The control device 9 includes a control unit 91, a storage unit 92, a communication unit 93, and an input/output I/F 94, and is communicably connected a control device (another control device) that controls each optical system in the laser light source 2 or the annealing optical system 11 via the communication unit 93 or the input/output I/F 94. The control device 9 is communicably connected to various measuring devices such as a pulse measuring instrument and an optical detector included in the laser annealing apparatus 1, and performs various controls on the laser light source 2 or the annealing optical system 11 based on measurement data output from these various measuring devices.

The control unit 91 has an arithmetic processing unit having a timing function such as one or a plurality of CPUs (Central Processing Units), MPUs (Micro-Processing Units), and GPUs (Graphics Processing Units), and performs various information processing and control processing for each optical system included in the laser light source 2 or the annealing optical system 11 by reading and executing a program P (program product) stored in the storage unit 92.

The storage unit 92 includes a volatile storage area such as a SRAM (Static Random Access Memory), a DRAM (Dynamic Random Access Memory), or a flash memory, and a nonvolatile storage area such as an EEPROM or a hard disk. The storage unit 92 stores the program P (program product) and data to be referred to at the time of processing in advance. The program P stored in the storage unit 92 may be a program P (program product) read from a recording medium 920 readable by the control unit 91. Further, the program P (program product) may be downloaded from an external computer (not illustrated) connected to a communication network (not illustrated) and stored in the storage unit 92.

The communication unit 93 is, for example, a communication module or a communication interface conforming to an Ethernet (registered trademark) standard, and an Ethernet cable is connected to the communication unit 93. The communication unit 93 is not limited to the case where the Ethernet cable, etc. is wired, and may be, for example, a communication interface compatible with wireless communication such as a narrow-range wireless communication module such as Wi-Fi (registered trademark) or Bluetooth (registered trademark), or a wide-range wireless communication module such as 4G and 5G.

The input/output I/F94 is a communication interface compliant with a communication standard such as RS232C or USB. An input device such as a keyboard or a display device 941 such as a liquid crystal display is connected to the input/output I/F 94.

FIG. 3 is a flowchart illustrating an example of a processing procedure by the control unit 91. The control unit 91 of the control device 9 included in the laser annealing apparatus 1 receives an operation of an operator by, for example, a keyboard connected to input and output, and performs the following processing based on the received operation.

The control unit 91 of the control device 9 acquires characteristic information of the first laser light source 21 and the second laser light source 22 (S101). The control unit 91 of the control device 9 acquires the characteristic information of the first laser light source 21 and the second laser light source 22 from a measuring device such as a pulse measuring instrument via the communication unit 93 or the input/output I/F 94. Alternatively, the control unit 91 of the control device 9 may acquire the characteristic information from the control device of the first laser light source 21 and the second laser light source 22. The characteristic information includes, for example, information about inter-pulse energy stability (energy stability: δ/mean), pointing stability (pointing: P), or both. The measuring device or the control device functions as a characteristic information detection unit for detecting the characteristic information of the first laser light source 21 and the second laser light source 22.

In a preparation process for annealing the substrate 8, the control unit 91 of the control device 9 may separately drive the first laser light source 21 and the second laser light source 22, and acquire characteristic information of each of the first laser light source 21 and the second laser light source 22 based on laser light emitted from the first laser light source 21 and laser light emitted from the second laser light source 22.

The control unit 91 of the control device 9 derives the transmittances of the first attenuator 31 and the second attenuator 32 based on the acquired characteristic information (S102). The control unit 91 of the control device 9 specifies a laser light source 2 having an excellent characteristic based on the inter-pulse energy stabilities or the pointing stabilities of the first laser light source 21 and the second laser light source 22 acquired as characteristic information. The control unit 91 of the control device 9 derives the transmittances of the attenuator 31 and the second attenuator 32 so that the transmittance of an attenuator connected to the laser light source 2 having the excellent characteristic is larger than the transmittance of an attenuator connected to the other laser light source 2.

As described above, the characteristic information such as the inter-pulse energy stability or the pointing stability is defined by a value indicating a degree of variation (standard deviation). Thus, as a value of the characteristic information decreases (closer to 0), the characteristic of the laser light source 2 becomes better. For example, when the inter-pulse energy stability (energy stability: δ1) of the first laser light source 21 is larger than the inter-pulse energy stability (energy stability: δ2) of the second laser light source 22 (δ1>δ2), the characteristic of the second laser light source 22 is better than the characteristic of the first laser light source 21, and the transmittance (T1) of the first attenuator 31 is smaller than the transmittance (T2) of the first attenuator 31 (T1<T2).

When the pointing stability P1 of the first laser light source 21 is smaller than the pointing stability P2 of the second laser light source 22 (P1<P2), the characteristic of the first laser light source 21 is better than the characteristic of the second laser light source 22, and the transmittance T1 of the first attenuator 31 becomes a value larger than the transmittance T2 of the first attenuator 31 (T1>T2).

For example, when the laser light source 2 having the excellent characteristic is specified based on a plurality of pieces of characteristic information based on the inter-pulse energy stability δ and the pointing stability P, the sum (δ+P) of values of these pieces of characteristic information may be used to compare a value (δ1+P1) of the characteristic information of the first laser light source 21 with a value (δ2+P2) of the characteristic information of the second laser light source 22.

The control unit 91 of the control device 9 specifies the laser light source 2 having the excellent characteristic based on characteristic information of each of the first attenuator 31 and the second attenuator 32, and determines a magnitude relationship between the transmittances of the first attenuator 31 and the second attenuator 32. The control unit 91 of the control device 9 further changes the transmittances T1 and T2 so that the total value of the density of energy emitted from the first attenuator 31 and the density of energy emitted from the second attenuator 32 becomes constant (E1×T1+E2×T2=constant).

The control unit 91 of the control device 9 may use a function for calculating the transmittances T1 and T2 using characteristic information (δ1, P1, δ2, and P2) of the first laser light source 21 and the second laser light source 22 as an input factor to derive the transmittances. Alternatively, a look-up table for defining (specifying) the transmittances T1 and T2 according to a combination pattern of the characteristic information (δ1, P1, δ2, and P2) of the first laser light source 21 and the second laser light source 22 may be stored in the storage unit 92 of the control device 9, and the control unit 91 of the control device 9 may derive the transmittances by referring to the look-up table.

The control unit 91 of the control device 9 generates control signals based on the derived transmittances (S103). The control unit 91 of the control device 9 outputs each of the generated control signals to the first attenuator 31 and the second attenuator 32 (S104). The control unit 91 of the control device 9 generates a control signal for the first attenuator 31 and a control signal for the second attenuator 32 based on the respective transmittances T1 and T2 of the first attenuator 31 and the second attenuator 32.

The control unit 91 of the control device 9 outputs the generated control signal for the first attenuator 31 to the first attenuator 31, and outputs the generated control signal for the second attenuator 32 to the second attenuator 32. Upon outputting these control signals, the control unit 91 of the control device 9 may output the control signals to the control devices of the first attenuator 31 and the second attenuator 32 via the communication unit 93.

The first attenuator 31 and the second attenuator 32 acquire (receive) the control signals output (transmitted) from the control device 9, and change the transmittances according to the acquired control signals. The control unit 91 of the control device 9 may perform a loop process to execute the processing from S101 again after executing the processing of S104. The control unit 91 of the control device 9 is not limited to the case where a series of processes according to the flow is performed in the preparation process, and may execute the processes in parallel with the processing process of the substrate 8 and dynamically changes the transmittances of the first attenuator 31 and the second attenuator 32 during the processing process (during a production process) of the substrate 8.

According to the present embodiment, the control device 9 of the laser annealing apparatus 1 (laser irradiation apparatus) performs a predetermined process related to laser emitted from each laser light source 2 according to each piece of characteristic information of the laser light source 2. In this way, in the laser annealing apparatus 1 including the plurality of laser light sources 2, even when there are individual product differences in the plurality of laser light sources 2, control can be performed by absorbing the individual differences (variations). Upon synthesizing respective laser beams emitted from the plurality of laser light sources 2, it is possible to improve the stability, etc. of the synthesized laser, and to suppress the irradiation unevenness of the substrate 8, etc. irradiated with the synthesized laser.

According to the present embodiment, since the control device 9 of the laser annealing apparatus 1 (laser irradiation apparatus) controls the transmittances of the first attenuator 31 and the second attenuator 32 based on the transmittances derived based on the characteristic information of the first laser light source 21 and the second laser light source 22, it is possible to appropriately control these attenuators.

According to the present embodiment, in the first laser light source 21 and the second laser light source 22, the control device 9 of the laser annealing apparatus 1 sets the transmittance of the attenuator of the laser light source 2 having the large value (δ) with regard to the inter-pulse energy stability (large variation and low energy stability) to be lower than the transmittance of the attenuator of the other laser light source 2. In this way, it is possible to increase the transmittance with respect to the laser light source 2 having a small value (δ) with regard to the inter-pulse energy stability (small variation and high energy stability), and preferentially use the laser light source 2 having the high energy stability to synthesize the laser light of the first laser light source 21 and the second laser light source 22, thereby improving processing quality with respect to the substrate 8, etc.

According to the present embodiment, in the first laser light source 21 and the second laser light source 22, the control device 9 of the laser annealing apparatus 1 sets the transmittance of the attenuator of the laser light source 2 having a large value (P) regarding the pointing stability (large variation and low pointing stability) to be lower than the transmittance of the attenuator of the other laser light source 2. In this way, it is possible to increase the transmittance with respect to the laser light source 2 having the small value (δ) with regard to the pointing stability (small variation and high pointing stability), and preferentially use the laser light source 2 having the high pointing stability to synthesize the laser light of the first laser light source 21 and the second laser light source 22, thereby improving processing quality with respect to the substrate 8, etc.

According to the present embodiment, the control device 9 of the laser annealing apparatus 1 derives the transmittances of the first attenuator 31 and the second attenuator 32 so that a synthetic energy density obtained by adding a value obtained by multiplying the energy density of the first laser light source 21 by the transmittance of the first attenuator 31 and a value obtained by multiplying the energy density of the second laser light source 22 by the transmittance of the second attenuator 32 becomes constant.

In this way, upon changing the transmittances of the first attenuator 31 and the second attenuator 32 while the laser annealing apparatus 1 is movable, the energy density (synthetic energy density) of laser with which the substrate 8 is irradiated may be kept constant, and occurrence of uneven irradiation may be suppressed.

Second Embodiment

FIG. 4 is a diagram illustrating a configuration example of a laser annealing apparatus according to a second embodiment (polarization ratio). The laser annealing apparatus 1 of the second embodiment includes an annealing optical system 11 including a projection lens 65, etc., a laser irradiation chamber 7, and a control device 9 similarly to the laser annealing apparatus 1 of the first embodiment, and further includes a first polarization ratio control unit 41 and a second polarization ratio control unit 42.

The first polarization ratio control unit 41 is disposed on the emission side of the first attenuator 31, and the second polarization ratio control unit 42 is disposed on the emission side of the second attenuator 32. The first polarization ratio control unit 41 and the second polarization ratio control unit 42 includes, for example, a ½ wavelength plate (λ/2 plate) and a polarization beam splitter, and changes a polarization ratio of a P-polarized wave and an S-polarized wave of incident laser light.

The first polarization ratio control unit 41 changes a polarization ratio of laser light emitted from the first attenuator 31. The second polarization ratio control unit 42 changes a polarization ratio of laser light emitted from the second attenuator 32. The first polarization ratio control unit 41 and the second polarization ratio control unit 42 are configured to change (vary) the respective polarization ratios based on control signals output from the control device 9.

When the transmittances of the first attenuator 31 and the second attenuator 32 are changed, the polarization ratios of the laser light emitted from the first attenuator 31 and the laser light emitted from the second attenuator 32 are changed according to the transmittances. Meanwhile, the control device 9 changes the corresponding polarization ratios according to the changed transmittances to perform a control operation so that a polarization ratio of each of laser light emitted from the first polarization ratio control unit 41 and laser light emitted from the second polarization ratio control unit 42 is constant.

Upon changing the transmittance of the first attenuator 31, the control device 9 changes the polarization ratio of the first polarization ratio control unit 41 and performs a control operation so that the polarization ratio of the laser light emitted from the first polarization ratio control unit 41 becomes constant. Upon changing the transmittance of the second attenuator 32, the control device 9 changes the polarization ratio of the second polarization ratio control unit 42 and performs a control operation so that the polarization ratio of the laser light emitted from the second polarization ratio control unit 42 becomes constant.

FIG. 5 is an explanatory diagram illustrating an example of a polarization ratio table. In the polarization ratio table, each polarization ratio corresponding to each transmittance is defined with a horizontal axis as a transmittance and a vertical axis as polarization ratio. Upon changing the polarization ratios of the first polarization ratio control unit 41 and the second polarization ratio control unit 42, for example, the control device 9 may refer to information (polarization ratio table) stored in the storage unit 92 of the control device 9 in a table format, and specify (derive) a polarization ratio according to a transmittance.

FIG. 6 is a flowchart illustrating an example of a processing procedure by the control unit 91. The control unit 91 of the control device 9 acquires the characteristic information of the first laser light source 21 and the second laser light source 22 (S201). The control unit 91 of the control device 9 derives the transmittances of the first attenuator 31 and the second attenuator 32 based on the acquired characteristic information (S202). The control unit 91 of the control device 9 performs processing of S201 and S202 similarly to S101 and S102 of the first embodiment.

The control unit 91 of the control device 9 derives the polarization ratios of the first polarization ratio control unit 41 and the second polarization ratio control unit 42 based on the transmittances (S203). For example, the control unit 91 of the control device 9 refers to the polarization ratio table stored in the storage unit 92 to derive the polarization ratios of the first polarization ratio control unit 41 and the second polarization ratio control unit 42 corresponding to the derived transmittances T1 and T2 of the first polarization ratio control unit 41 and the second polarization ratio control unit 42.

The control unit 91 of the control device 9 generates control signals based on the derived transmittances and polarization ratios. (S204). The control unit 91 of the control device 9 outputs each of the generated control signals to the first attenuator 31, the second attenuator 32, the first polarization ratio control unit 41, and the second polarization ratio control unit 42 (S205). The control unit 91 of the control device 9 generates and outputs control signals to the first laser light source 21 and the second laser light source 22 similarly to S103 and S104 of the first embodiment.

The control unit 91 of the control device 9 generates a control signal for the first polarization ratio control unit 41 and a control signal for the second polarization ratio control unit 42 based on each of the derived polarization ratios. The control unit 91 of the control device 9 outputs the generated control signal for the first polarization ratio control unit 41 to the first polarization ratio control unit 41, and outputs the generated control signal for the second polarization ratio control unit 42 to the second polarization ratio control unit 42. Upon outputting these control signals, the control unit 91 of the control device 9 may output the control signals to the control devices of the first polarization ratio control unit 41 and the second polarization ratio control unit 42 via the communication unit 93.

The first attenuator 31 and the second attenuator 32 acquire (receive) control signals output (transmitted) from the control device 9, and change the respective transmittances according to the acquired control signals. The first polarization ratio control unit 41 and the second polarization ratio control unit 42 acquire (receive) control signals output (transmitted) from the control device 9, and change the respective polarization ratios according to the acquired control signals. The control unit 91 of the control device 9 may perform a loop process to execute processing from S201 again after executing processing of S205 similarly to the first embodiment.

According to the present embodiment, the control device 9 of the laser annealing apparatus 1 changes the polarization ratios in the first polarization ratio control unit 41 and the second polarization ratio control unit 42 based on the derived transmittances so that the polarization ratio of the laser emitted from each of the first polarization ratio control unit 41 and the second polarization ratio control unit 42 becomes constant. For example, the control unit 91 of the laser annealing apparatus 1 may specify (derive) the polarization ratios according to the transmittances by referring to the polarization ratio table stored in the storage unit 92.

As the transmittances of the first attenuator 31 and the second attenuator 32 change, the polarization ratio of the laser emitted from each of the first attenuator 31 and the second attenuator 32 changes. Meanwhile, the polarization ratios of the first polarization ratio control unit 41 and the second polarization ratio control unit 42 may be changed to keep the polarization ratio of the synthesized laser constant, thereby suppressing irradiation unevenness.

Third Embodiment

FIG. 7 is an explanatory diagram illustrating an example of a transmittance learning model 921 according to a third embodiment (transmittance learning model 921). The control unit 91 of the control device 9 trains a neural network using training data, and generates the transmittance learning model 921 that outputs the transmittances of the first attenuator 31 and the second attenuator 32 when the characteristic information of the first laser light source 21 and the second laser light source 22 is input. Alternatively, the transmittance learning model 921 may output the transmittances of the first attenuator 31 and the second attenuator 32, and the polarization ratios of the first polarization ratio control unit 41 and the second polarization ratio control unit 42 when the characteristic information of the first laser light source 21 and the second laser light source 22, the luminance (detection value) from the OED sensor 63, and the average luminance (detection value) from the unevenness monitor 64 are input.

The training data includes problem data containing the characteristic information of the first laser light source 21 and the second laser light source 22 and response data containing the transmittances of the first attenuator 31 and the second attenuator 32, and is stored in the storage unit 92 of the control device 9.

Alternatively, the problem data may contain the characteristic information of the first laser light source 21 and the second laser light source 22, the luminance (detection value) from the OED sensor 63, and the average luminance (detection value) from the unevenness monitor 64. Further, the response data may contain the transmittances of the first attenuator 31 and the second attenuator 32 and the polarization ratios of the first polarization ratio control unit 41 and the second polarization ratio control unit 42. Original data of the training data can be generated, for example, by aggregating operation record data of a plurality of laser annealing apparatuses 1.

The neural network (transmittance learning model 921) trained using the training data is expected to be used as a program module that is a part of artificial intelligence software. The transmittance learning model 921 is used in the control device 9, and a neural network system is configured by being executed by the control device 9 having the arithmetic processing capacity to have the arithmetic processing capacity in this way.

The transmittance learning model 921 includes a DNN (Deep Neural Network), and has an input layer for receiving input of the characteristic information of the first laser light source 21 and the second laser light source 22, an intermediate layer for extracting a feature amount of the characteristic information, and an output layer for outputting a transmittance. Alternatively the intermediate layer may receive input of the characteristic information of the first laser light source 21 and the second laser light source 22, the luminance (detection value) from the OED sensor 63, and the average luminance (detection value) from the unevenness monitor 64. The intermediate layer may extract the feature amounts of the characteristic information and the detection value, and the output layer may output the transmittance and the polarization ratio.

The input layer has a plurality of neurons for receiving input such as the characteristic information of the first laser light source 21 and the second laser light source 22, and passes an input value to the intermediate layer. The intermediate layer is defined using an activation function such as a ReLu function or a sigmoid function, has a plurality of neurons for extracting feature amounts of respective input values, and passes the extracted feature amounts to the output layer. Parameters such as a weighting coefficient and a bias value of the activation function are optimized using a back propagation method. The output layer may include, for example, a fully connected layer, output the transmittances of the first attenuator 31 and the second attenuator 32 based on the feature amounts output from the intermediate layer, and further output the polarization ratios of the first polarization ratio control unit 41 and the polarization ratio control unit 42.

In the present embodiment, the transmittance learning model 921 is set to the DNN. However, the disclosure is not limited thereto, and it is possible to adopt a learning model constructed by another learning algorithm such as a neural network other than the DNN, a recurrent neural network (RNN), a long-short term model (LSTM), a CNN, a support vector machine (SVM), a Bayesian network, a linear regression, a regression tree, a multiple regression, a random forest, or an ensemble.

It is assumed that the control device 9 included in the laser annealing apparatus 1 generates the transmittance learning model 921. However, the disclosure is not limited thereto, and the transmittance learning model 921 may be trained and generated by an external server device such as a cloud server other than the control device 9. The transmittance learning model 921 is assumed to be used in the control device 9. However, the disclosure is not limited thereto, and the control device 9 may communicate with, for example, a cloud server connected to the Internet, etc. via the communication unit 93, and acquire the transmittances output by the transmittance learning model 921 implemented in the cloud server.

FIG. 8 is a flowchart illustrating an example of a processing procedure by the control unit 91. The control unit 91 of the control device 9 acquires the characteristic information of the first laser light source 21 and the second laser light source 22 (S301). The control unit 91 of the control device 9 performs processing of S301 similarly to S101 of the first embodiment.

The control unit 91 of the control device 9 inputs the acquired characteristic information to the transmittance learning model 921 to derive the transmittances of the first attenuator 31 and the second attenuator 32 (S302). The control unit 91 of the control device 9 inputs the characteristic information of the first laser light source 21 and the second laser light source 22 to the transmittance learning model 921. The transmittance learning model 921 outputs the transmittances of the first attenuator 31 and the second attenuator 32 according to the input characteristic information. The control unit 91 of the control device 9 derives the transmittances of the first attenuator 31 and the second attenuator 32 by acquiring the transmittances output by the transmittance learning model 921.

The control unit 91 of the control device 9 generates the control signals based on the derived transmittances (S303). The control unit 91 of the control device 9 outputs the generated control signals to the first attenuator 31 and the second attenuator 32 (S304). The control unit 91 of the control device 9 performs processing of S303 and S304 similarly to S103 and S104 of the first embodiment.

In the flowchart of the present embodiment, it is assumed that the control unit 91 of the control device 9 inputs the acquired characteristic information to the transmittance learning model 921 and derives the transmittances of the first attenuator 31 and the second attenuator 32. However, the disclosure is not limited thereto. The control unit 91 of the control device 9 may input the acquired characteristic information of the first laser light source 21 and the second laser light source 22, the detection value from the OED sensor 63, and the detection value from the unevenness monitor 64 to the transmittance learning model 921, and derive the transmittances of the first attenuator 31 and the second attenuator 32 and the polarization ratios of the first polarization ratio control unit 41 and the second polarization ratio control unit 42.

In this case, the control unit 91 of the control device 9 generates transmittance control signals based on the derived transmittances and generates polarization ratio control signals based on the derived polarization ratios. The control unit 91 of the control device 9 outputs the transmittance control signals to the first attenuator 31 and the second attenuator 32, respectively, and outputs the polarization ratio control signals to the first polarization ratio control unit 41 and the second polarization ratio control unit 42, respectively.

According to the present embodiment, since the control device 9 of the laser annealing apparatus 1 uses the transmittance learning model 921 that outputs the transmittance of the first attenuator 31 and the transmittance of the attenuator 32 when the characteristic information of the first laser light source 21 and the characteristic information of the second laser light source 22 are input, it is possible to efficiently derive the transmittance of each of the first attenuator 31 and the second attenuator 32. Alternatively, by using the transmittance learning model 921, it is possible to efficiently derive the transmittances of the first attenuator 31 and the second attenuator 32 and the polarization ratios of the first polarization ratio control unit 41 and the second polarization ratio control unit 42 based on the characteristic information of the first laser light source 21 and the second laser light source 22, the detection value from the OED sensor 63, and the detection value from the unevenness monitor 64.

Fourth Embodiment

FIG. 9 is a diagram illustrating a configuration example of a laser annealing apparatus 1 according to a fourth embodiment (synchronization deviation). The laser annealing apparatus 1 of the fourth embodiment includes an annealing optical system 11, a laser irradiation chamber 7, and a control device 9 similarly to the laser annealing apparatus 1 of the first embodiment, and includes an X-axis drive system 73 and a Y-axis drive system 74 for driving the stage 71.

The laser annealing apparatus 1 of the fourth embodiment includes a biplanar phototube 62 for detecting a pulse waveform, and the biplanar phototube 62 is provided at the end of the annealing optical system 11 to detect a pulse waveform of each of laser light emitted from the first laser light source 21 and laser light emitted from the second laser light source 22 based on, for example, transmitted light transmitted through, for example, an epi-illumination mirror 61.

The control device 9 is communicably connected to the biplanar phototube 62 via the communication unit 93 or the input/output I/F 94 to acquire a pulse waveform of laser light from the first laser light source 21 and a pulse waveform of laser light from the second laser light source 22 from the biplanar phototube 62. The pulse waveforms of the first laser light source 21 and the second laser light source 22 correspond to characteristic information, and the biplanar phototube 62 for detecting the pulse waveforms functions as a characteristic information detection unit for detecting the characteristic information of the first laser light source 21 and the second laser light source 22.

The control device 9 detects synchronization deviation between the laser light emitted from the first laser light source 21 and the laser light emitted from the second laser light source 22 based on each of the acquired pulse waveforms of the first laser light source 21 and the second laser light source 22. The control device 9 generates a notification signal indicating that an allowable synchronization deviation value (allowable threshold value) is exceeded according to the magnitude of the detected synchronization deviation (synchronization deviation value), and outputs the notification signal to, for example, the display device 941, etc. Alternatively, when the detected synchronization deviation value exceeds the allowable threshold value (greater than or equal to the allowable threshold value), the control device 9 may output a suspension signal for suspending the operation of the laser annealing apparatus 1 and suspend the laser annealing apparatus 1.

FIG. 10 is an explanatory diagram illustrating an example of a synchronization deviation value learning model 922. Upon detecting synchronization deviation, the control device 9 uses the synchronization deviation value learning model 922 stored in the storage unit 92 of the control device 9. By using the synchronization deviation value learning model 922, it is possible to derive a synchronization deviation value between the laser light emitted from the first laser light source 21 and the laser light emitted from the second laser light source 22. The synchronization deviation value may be shown, for example, in time units of 1 ns. Upon defining the synchronization deviation value in this way, a pulse waveform in which the synchronization deviation value is 0 ns indicates that synchronization deviation does not occur.

Figure 11:
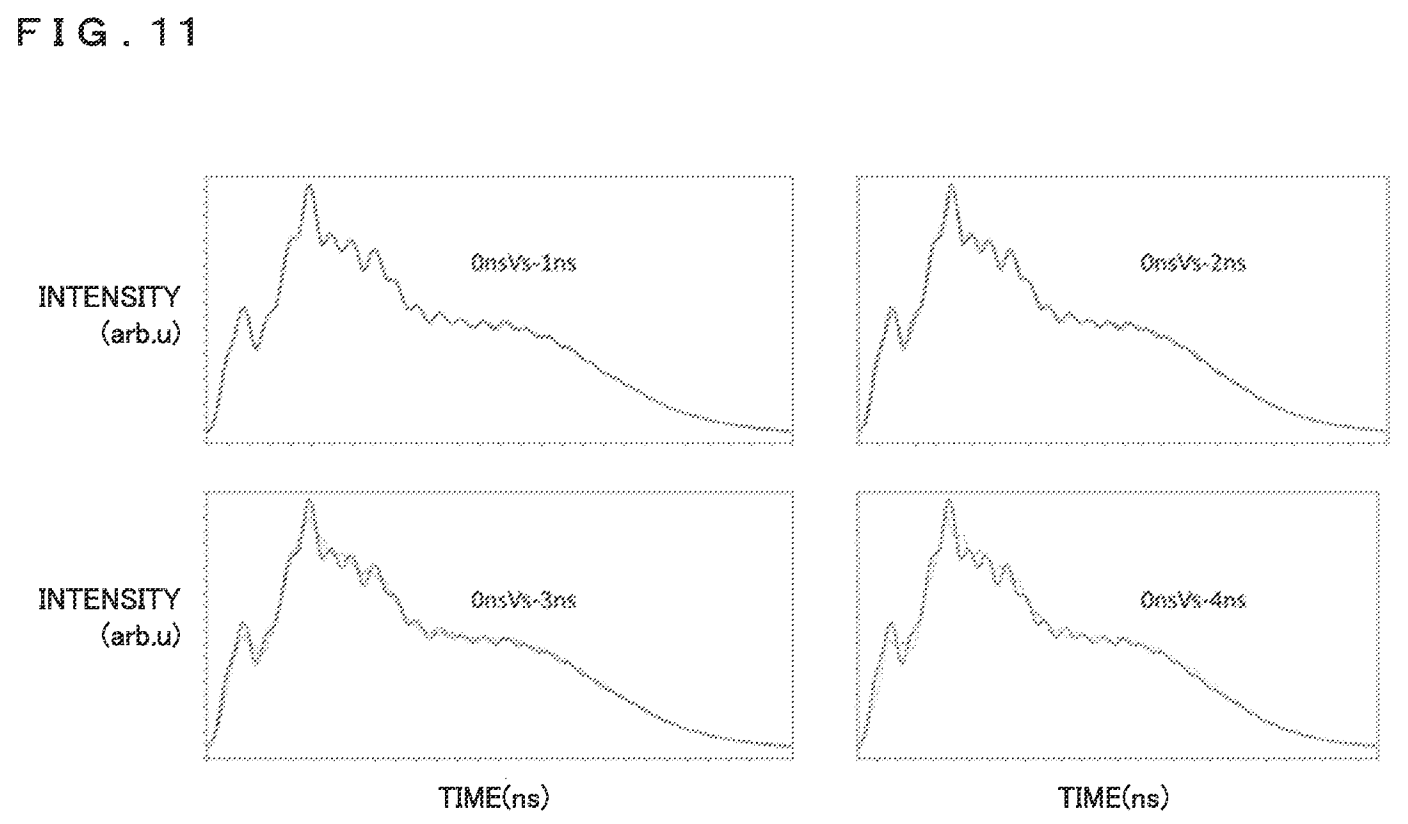

FIG. 11 is an explanatory diagram illustrating synchronization deviation in a pulse signal. In the illustration in the present embodiment, the pulse waveform of the first laser light source 21 and the pulse waveform of the second laser light source 22 having synchronization deviation values of 1 ns (upper left), 2 ns (upper right), 3 ns (lower left), and 4 ns (lower right) are illustrated in graph formats. In the graphs, a vertical axis indicates the intensity of laser light and a horizontal axis indicates the time.

When the neural network is trained using the training data and the pulse waveform of the first laser light source 21 and the pulse waveform of the second laser light source 22 are input, the control unit 91 of the control device 9 generates the synchronization deviation value learning model 922 that outputs the synchronization deviation value between the first laser light source 21 and the second laser light source 22. The training data includes problem data containing the pulse waveform of the first laser light source 21 and the pulse waveform of the second laser light source 22 and response data containing the synchronization deviation value, and is stored in the storage unit 92 of the control device 9. The original data of the training data can be generated, for example, by aggregating operation record data of the plurality of laser annealing apparatuses 1.

With regard to a combination of the individual problem data and response data, the training data may contain a combination in which the synchronization deviation value is 0 ns, that is, a pulse waveform in which synchronization deviation does not occur and a pulse waveform in which the synchronization deviation value increases stepwise from 1 ns to 5 ns, for example. That is, for example, synchronization deviation values may be classified into 11 stages from –5 ns to 5 ns, and data of about 100 pulse waveforms may be used in each of the synchronization deviation values (for each class) to generate the training data. Upon performing learning, to align heights of waveforms according to a setting condition, data of the pulse waveforms (waveform data) may be normalized.

As described above, the training data contains pulse waveform data of the first laser light source 21 and the second laser light source 22 in which synchronization deviation does not occur, and pulse waveform data of the first laser light source 21 and the second laser light source 22 in which synchronization deviation occurs. In data in which synchronization deviation occurs, the synchronization deviation values may be set to be different stepwise in units of ins, for example, and the data may be classified according to the synchronization deviation values. The control unit 91 of the control device 9 generates training data by collecting a pulse waveform having synchronization deviation and a pulse waveform not having synchronization deviation, and trains a neural network using the generated training data to generate the synchronization deviation value learning model 922.

The synchronization deviation value learning model 922 includes a DNN similarly to the transmittance learning model 921 of the first embodiment, and has an input layer for receiving input of the pulse waveform of each of the first laser light source 21 and the second laser light source 22, an intermediate layer for extracting a feature amount of the pulse waveform, and an output layer for outputting a synchronization deviation value.

The input layer has a plurality of neurons for receiving input of the pulse waveform of each of the first laser light source 21 and the second laser light source 22, and passes an input value to the intermediate layer. The intermediate layer is defined using an activation function such as a ReLu function or a sigmoid function, has a plurality of neurons for extracting feature amounts of respective input values, and passes the extracted feature amounts to the output layer. Parameters such as a weighting coefficient and a bias value of the activation function are optimized using a back propagation method. The output layer may include, for example, a fully connected layer, and output the synchronization deviation value based on the feature amounts output from the intermediate layer.

In the present embodiment, the synchronization deviation value learning model 922 is assumed to be the DNN. However, the disclosure is not limited thereto, and the synchronization deviation value learning model 922 may be a learning model constructed by another learning algorithm such as a neural network other than the DNN similarly to the transmittance learning model 921 of the first embodiment. Similarly to the transmittance learning model 921 of the first embodiment, the synchronization deviation value learning model 922 may be trained and generated by an external server device such as a cloud server other than the control device 9. Similarly to the first embodiment, the control device 9 may communicate with, for example, a cloud server, etc. connected to the Internet, etc. via the communication unit 93, and acquire a synchronization deviation value output by the synchronization deviation value learning model 922 implemented in the cloud server.

Upon generating (training) the synchronization deviation value learning model 922, the two-laser light source configuration of the first laser light source 21 and the second laser light source 22 is adopted. However, training data may be generated using a pulse waveform of each of laser beams emitted from three or more laser light sources 2, and the synchronization deviation value learning model 922 may be trained.

FIG. 12 is an explanatory diagram illustrating an actual synchronization deviation value and a synchronization deviation value by the synchronization deviation value learning model 922 in a confusion matrix. The confusion matrix illustrated in the present embodiment illustrates an example of a comparison between the actual synchronization deviation value and the synchronization deviation value output by the synchronization deviation value learning model 922.

For example, at synchronization deviation values divided into 11 stages (11 classes) at ±5 ms, a synchronization deviation value prepares 30 data sets (pulse waveform of the first laser light source 21, pulse waveform of the second laser light source 22, synchronization deviation value), and the total number of data sets is 330 (30×11). For example, when the synchronization deviation values are −5 ns, −1 ns, and 5 ns, synchronization deviation values output by the synchronization deviation value learning model 922 are all the same as the actual synchronization deviation values, that is, a correct answer rate is 100%. In addition, the correct answer rate is 90% or more for other synchronization deviation values, indicating that the synchronization deviation value learning model 922 can output (estimate) the synchronization deviation value with relatively high accuracy.

Figure 13:
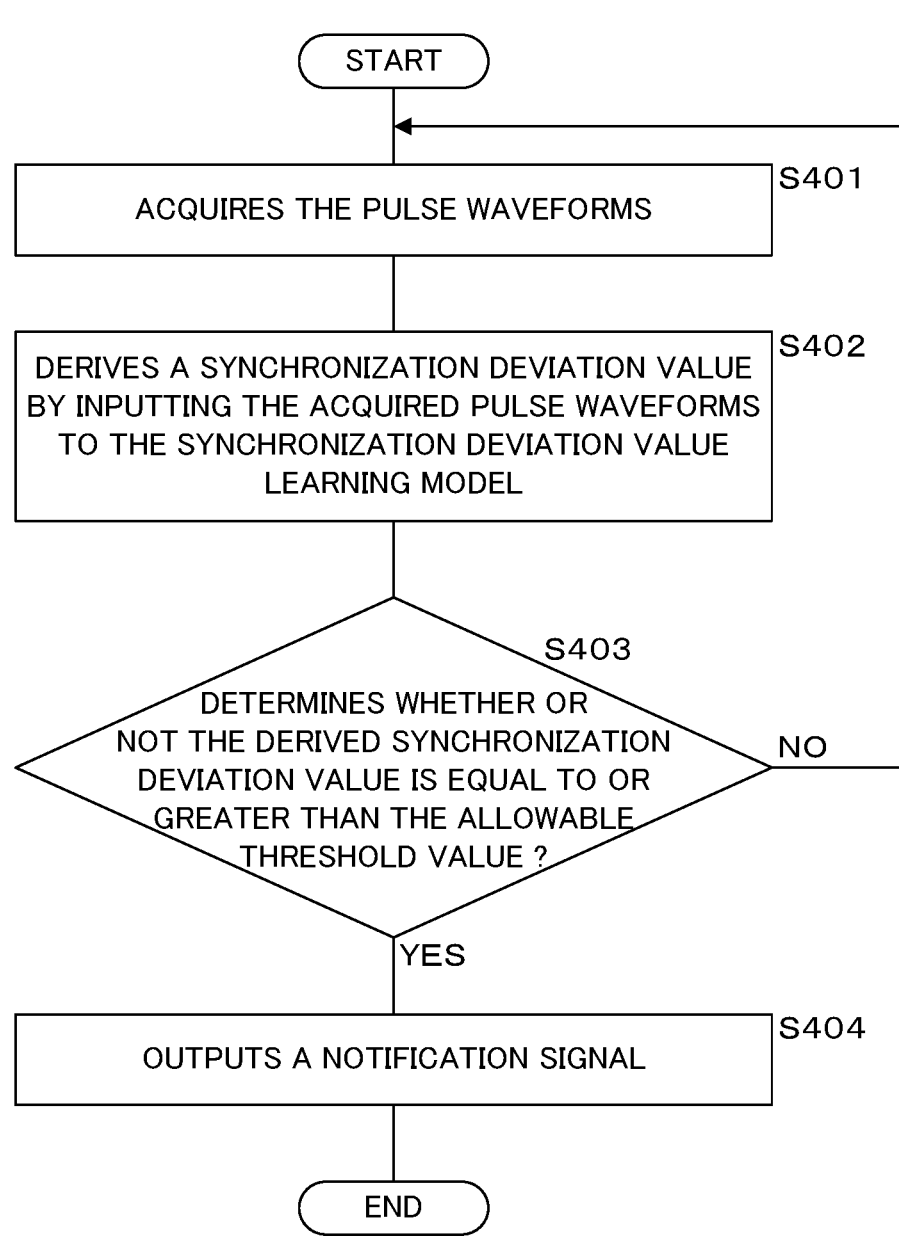
FIG. 13 is a flowchart illustrating an example of a processing procedure by a control unit.

FIG. 13 is a flowchart illustrating an example of a processing procedure by the control unit 91. The control unit 91 of the control device 9 acquires the pulse waveforms of the first laser light source 21 and the second laser light source 22 (S401). The control unit 91 of the control device 9 acquires the pulse waveform of the laser light from the first laser light source 21 and the pulse waveform of the laser light from the second laser light source 22 from the biplanar phototube 62.

The control unit 91 of the control device 9 derives a synchronization deviation value by inputting the acquired pulse waveforms to the synchronization deviation value learning model 922 (S402). The control unit 91 of the control device 9 inputs the pulse waveform of each of the first laser light source 21 and the second laser light source 22 to the synchronization deviation value learning model 922. The synchronization deviation value learning model 922 outputs a synchronization deviation value between these pulse waveforms based on the input pulse waveforms. The control unit 91 of the control device 9 acquires the synchronization deviation value output by the synchronization deviation value learning model 922 to derive the synchronization deviation value. For example, the derived synchronization deviation value may be classified as a class divided for each 1 ns.

The control unit 91 of the control device 9 determines whether or not the derived synchronization deviation value is equal to or greater than the allowable threshold value (S403). The control unit 91 of the control device 9 refers to, for example, an allowable threshold value stored in advance in the storage unit 92, and determines whether or not the derived synchronization deviation value is equal to or greater than the allowable threshold value. The allowable threshold value indicates an allowable synchronization deviation value in a processing process of the substrate 8 by the laser annealing apparatus 1, and is a synchronization deviation value at which irradiation unevenness occurring due to synchronization deviation is allowed in terms of processing quality. The allowable threshold value is not limited to being set as a single value, and may be defined by a plurality of values that are stepwise different.

When the synchronization deviation value is not equal to or greater than the allowable threshold value, that is, is less than the allowable threshold value (S403: NO), the control unit 91 of the control device 9 performs a loop process to execute processing of S301 again.

When the synchronization deviation value is equal to or greater than the allowable threshold value (S403: YES), the control unit 91 of the control device 9 outputs a notification signal (S404). When the synchronization deviation value is equal to or greater than the allowable threshold value, the control unit 91 of the control device 9 outputs a notification signal to, for example, the display device 941, etc. In this way, it is possible to efficiently notify an administrator of the laser annealing apparatus 1 that synchronization deviation exceeding the allowable threshold value occurs.

According to the present embodiment, by using the synchronization deviation value learning model 922 that outputs synchronization deviation values in a plurality of pulse waveforms when the plurality of pulse waveforms is input, the control device 9 of the laser annealing apparatus 1 can efficiently derive a synchronization deviation value in a pulse waveform of laser light emitted from each of the plurality of laser light sources 2. In this way, for example, when compared to a method based on a feature amount such as an area value of a pulse waveform, it is possible to efficiently detect a short synchronization deviation of laser light using the laser annealing apparatus 1 according to the present embodiment.

By outputting a notification signal when the derived synchronization deviation value exceeds the predetermined allowable threshold value, it is possible to notify the operator of the laser annealing apparatus 1 that a state of synchronization deviation of a pulse waveform generated between the plurality of laser light sources 2 is a state in which it is difficult to operate the laser annealing apparatus 1, that is, to continue the production of the semiconductor device. By performing the notification, it is possible to promote an appropriate response to the synchronization deviation and early recovery, and it is possible to efficiently suppress occurrence of irradiation unevenness due to the synchronization deviation.

Other Embodiments

FIGS. 14, 15, 16, 17, and 18 are process sectional views illustrating a method of manufacturing a semiconductor device according to another embodiment (method of manufacturing a semiconductor device). As another embodiment, a description will be given of a method of manufacturing a semiconductor device using the laser annealing apparatus 1 according to the embodiment. In the method of manufacturing the semiconductor device below, an annealing process using the laser annealing apparatus 1 according to the first to fourth embodiments is performed in a process of crystallizing an amorphous semiconductor film.

The semiconductor device is a semiconductor device including a TFT (Thin Film Transistor), and in this case, an amorphous silicon film 84 can be crystallized by being irradiated with laser light to form a polysilicon film 85. The polysilicon film 85 is used as a semiconductor layer having a source region, a channel region, and a drain region of the TFT.

The laser annealing apparatus 1 according to the embodiment described above is suitable for manufacturing a TFT array substrate. Hereinafter, a method of manufacturing the semiconductor device having the TFT will be described.

First, as illustrated in FIG. 14, a gate electrode 82 is formed on a glass substrate 81 (substrate 8). As the gate electrode 82, for example, it is possible to use a metal thin film containing aluminum, etc. Subsequently, as illustrated in FIG. 15, a gate insulating film 83 is formed on the gate electrode 82. The gate insulating film 83 is formed so as to cover the gate electrode 82. Thereafter, as illustrated in FIG. 16, the amorphous silicon film 84 is formed on the gate insulating film 83. The amorphous silicon film 84 is disposed to overlap with the gate electrode 82 via the gate insulating film 83.

The gate insulating film 83 is a silicon nitride film (SiNx), a silicon oxide film ($SiO_2$ film), a laminated film thereof, etc. Specifically, the gate insulating film 83 and the amorphous silicon film 84 are continuously formed by a CVD (Chemical Vapor Deposition) method. The glass substrate 81 having the amorphous silicon film 84 serves as the semiconductor film in the laser annealing apparatus 1 (laser irradiation apparatus).

Then, as illustrated in FIG. 17, the amorphous silicon film 84 is crystallized by being irradiated with laser light L3 using the laser annealing apparatus 1 described above, thereby forming the polysilicon film 85. In this way, the polysilicon film 85 in which silicon is crystallized is formed on the gate insulating film 83. Upon performing this process, it is possible to suppress occurrence of unevenness in the polysilicon film 85 by acquiring characteristic information in each of the plurality of laser light sources 2 such as the first laser light source 21 and the second laser light source 22, and performing predetermined processing disclosed in the first to fourth embodiments according to each piece of the acquired characteristic information.

Thereafter, as illustrated in FIG. 18, an interlayer insulating film 86, a source electrode 87*a*, and a drain electrode 87*b* are formed on the polysilicon film 85. The interlayer insulating film 86, the source electrode 87*a*, and the drain electrode 87*b* can be formed using a general photolithography method or a film forming method. A subsequent manufacturing process differs depending on the device to be finally manufactured, and thus a description thereof will be omitted.

By using the method of manufacturing the semiconductor device described above, it is possible to manufacture a semiconductor device including a TFT including a polycrystalline semiconductor film. Such a semiconductor device is suitable for controlling a high-definition display such as an organic EL (Electro Luminescence) display. By suppressing unevenness of the polysilicon film 85 as described above, it is possible to manufacture a display device having excellent display characteristics with high productivity.

Note that the present disclosure is not limited to the above embodiments, and can be appropriately modified without departing from the spirit. For example, the present disclosure is not limited to the example in which the amorphous silicon film 84 is irradiated with laser light to form the polysilicon film 85, and the amorphous silicon film 84 may be irradiated with laser light to form a microcrystal silicon film. Further, an amorphous film other than the silicon film may be irradiated with laser light to form a crystallized film.

The embodiments disclosed this time should be considered to be exemplary in all respects and not restrictive. Technical features described in each example can be combined with each other and the scope of the invention is intended to include all modifications within the scope of the claims and scope equivalent to the scope of the claims.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

What is claimed is:

1. A laser irradiation apparatus including a plurality of laser light sources, the laser irradiation apparatus comprising:

a control unit configured to control with regard to lasers emitted from the plurality of laser light sources, and a plurality of attenuators, each of the plurality of attenuators configured to determine a transmittance from a laser light emitted from a laser light source in the plurality of laser light sources, wherein the control unit acquires characteristic information of each of the plurality of laser light sources, derives a transmittance of each attenuator based on the characteristic information of each of the plurality of laser light sources, controls transmittance of each attenuator based on a derived transmittance, and performs a predetermined process according to each piece of acquired characteristic information.

2. The laser irradiation apparatus according to claim 1, wherein the plurality of laser light sources includes a first laser light source and a second laser light source, wherein the plurality of attenuators includes a first attenuator configured to determine a transmittance of laser light emitted from the first laser light source and a second attenuator configured to determine a transmittance of laser light emitted from the second laser light source, and the control unit derives a transmittance of each of the first attenuator and the second attenuator based on characteristic information of each of the first laser light source and the second laser light source, and controls transmittances of the first attenuator and the second attenuator based on a derived transmittance.

3. The laser irradiation apparatus according to claim 2, wherein the characteristic information contains information related to energy stabilities of the first laser light source and the second laser light source, and the control unit sets a transmittance of an attenuator of one of the first laser light source and the second laser light source having more excellent energy stability to be higher than a transmittance of an attenuator of the other laser light source.

4. The laser irradiation apparatus according to claim 2, wherein the characteristic information contains information related to pointing stabilities of the first laser light source and the second laser light source, and the control unit sets a transmittance of an attenuator of one of the first laser light source and the second laser light source having excellent pointing stability to be higher than a transmittance of an attenuator of the other laser light source.

5. The laser irradiation apparatus according to claim 2, wherein the control unit derives transmittances of the first attenuator and the second attenuator so that a synthetic energy density obtained by adding a value obtained by multiplying an energy density of the first laser light source by a transmittance of the first attenuator and a value obtained by multiplying an energy density of the second laser light source by a transmittance of the second attenuator becomes constant.

6. The laser irradiation apparatus according to claim 2, further comprising:
a first polarization ratio control unit provided on an emission end side of the first attenuator; and
a second polarization ratio control unit provided on an emission end side of the second attenuator,
wherein the control unit changes polarization ratios in the first polarization ratio control unit and the second polarization ratio control unit based on derived transmittances.

7. The laser irradiation apparatus according to claim 2, wherein the control unit inputs acquired characteristic information of the first laser light source and the second laser light source to a transmittance learning model for outputting a transmittance of the attenuator and a transmittance of the second attenuator when characteristic information of the first laser light source and characteristic information of the second laser light source are input, thereby deriving a transmittance of each of the first attenuator and the second attenuator.

8. The laser irradiation apparatus according to claim 7, further comprising:

a first polarization ratio control unit provided on an emission end side of the first attenuator;
a second polarization ratio control unit provided on an emission end side of the second attenuator; and
an OED sensor and an unevenness monitor configured to detect a luminance of a substrate irradiated with laser light from the laser light sources,
wherein when characteristic information of the first laser light source, characteristic information of the second laser light source, a detection value from the OED sensor, and a detection value from the unevenness monitor are input, the transmittance learning model outputs a transmittance of the first attenuator, a transmittance of the second attenuator, a polarization ratio of the first polarization ratio control unit, and a polarization ratio of the second polarization ratio control unit, and
the control unit inputs the acquired characteristic information of the first laser light source and the second laser light source and the acquired detection values from the OED sensor and the unevenness monitor to the transmittance learning model, thereby deriving a transmittance of each of the first attenuator and the second attenuator and a polarization ratio of each of the first polarization ratio control unit and the second polarization ratio control unit.

9. The laser irradiation apparatus according to claim 1, wherein the control unit
acquires a pulse waveform of laser emitted from each of the plurality of laser light sources as the characteristic information,
derives synchronization deviation values of a plurality of acquired pulse waveforms, and
outputs a notification signal when a derived synchronization deviation value is equal to or greater than a predetermined allowable threshold value.

10. The laser irradiation apparatus according to claim 8, wherein the control unit inputs a plurality of acquired pulse waveforms to a synchronization deviation value learning model for outputting synchronization deviation values of a plurality of pulse waveforms when the plurality of pulse waveforms is input, thereby deriving the synchronization deviation values.

11. A laser irradiation method of causing a computer configured to perform control with regard to laser emitted from a plurality of laser light sources and a plurality of attenuators to execute processes of:
(A) acquiring characteristic information of each of the plurality of laser light sources;
(B) deriving a transmittance of each attenuator based on the characteristic information of each of the plurality of laser light sources,
(C) controlling transmittance of each attenuator based on a derived transmittance, and
(D) performing a predetermined process according to each piece of acquired characteristic information.

12. A recording medium recording a program to be readable, the program causing a computer configured to perform control with regard to laser emitted from a plurality of laser light sources and a plurality of attenuators to execute processes of:
(A) acquiring characteristic information of each of the plurality of laser light sources;
(B) deriving a transmittance of each attenuator based on the characteristic information of each of the plurality of laser light sources, (C) controlling transmittance of each attenuator based on a derived transmittance, and (D) performing a predetermined process according to each piece of acquired characteristic information.

* * * * *